US012596176B2

(12) United States Patent
Liang et al.

(10) Patent No.: US 12,596,176 B2
(45) Date of Patent: Apr. 7, 2026

(54) CONTROL METHOD OF LIDAR, AND LIDAR

(71) Applicant: HESAI TECHNOLOGY CO., LTD., Shanghai (CN)

(72) Inventors: Feng Liang, Shanghai (CN); Shaoqing Xiang, Shanghai (CN); Congbo Shi, Shanghai (CN); Xiaotong Zhou, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 772 days.

(21) Appl. No.: 18/145,333

(22) Filed: Dec. 22, 2022

(65) Prior Publication Data

US 2023/0129970 A1      Apr. 27, 2023

Related U.S. Application Data

(63) Continuation of application No. PCT/CN2021/106707, filed on Jul. 16, 2021.

(30) Foreign Application Priority Data

Nov. 20, 2020    (CN) .......................... 202011315015.9

(51) Int. Cl.
*G01S 7/48*          (2006.01)
*G01S 7/484*         (2006.01)
          (Continued)

(52) U.S. Cl.
CPC ............ *G01S 7/4802* (2013.01); *G01S 7/484* (2013.01); *G01S 7/4863* (2013.01); *G01S 7/497* (2013.01); *G01S 17/26* (2020.01)

(58) Field of Classification Search
CPC ...... G01S 7/4802; G01S 7/484; G01S 7/4863; G01S 7/497; G01S 17/26; G01S 7/4815; G01S 17/42; G01S 7/4865; G01S 17/48
See application file for complete search history.

(56) References Cited

U.S. PATENT DOCUMENTS 10,173,072 B2 * 1/2019 Planard-Luong ...... A61N 5/062
2014/0240691 A1 8/2014 Mheen et al.
          (Continued)

FOREIGN PATENT DOCUMENTS

CN    102608613 A    7/2012
CN    105988123 A    10/2016
          (Continued)

OTHER PUBLICATIONS

International Search Report and Written Opinion mailed Oct. 18, 2021, in connection with International Patent Application No. PCT/CN2021/106707, 11 pgs. (including translation).
          (Continued)

*Primary Examiner* — Seung C Sohn
(74) *Attorney, Agent, or Firm* — Chiesa Shahinian & Giantomasi PC; Xuezheng Wang

(57)          ABSTRACT

A control method of a lidar is provided. The lidar includes a laser emitter array with N laser emitters. The control method includes: controlling n laser emitters to emit a first detection laser beam, and controlling k laser emitters among the n laser emitters to emit a second detection laser beam; receiving echoes, reflected by a target object, of the first detection laser beam and the second detection laser beam; calculating a distance of the target object according to the echoes; and reducing, in a case that the target object is detected in a preset distance, an emission intensity of the first detection laser beam emitted by at least parts of the n laser emitters in a range corresponding to the target object in a next detection period.

22 Claims, 14 Drawing Sheets

(51) Int. Cl.
    *G01S 7/4863*      (2020.01)
    *G01S 7/497*       (2006.01)
    *G01S 17/26*       (2020.01)

(56)             References Cited

U.S. PATENT DOCUMENTS

| | | |
|---|---|---|
| 2022/0120869 A1 | 4/2022 | Yang et al. |
| 2022/0260677 A1 | 8/2022 | Yang et al. |
| 2023/0116867 A1* | 4/2023 | Xing ...................... G06V 20/58 |
| | | 701/28 |

FOREIGN PATENT DOCUMENTS

| | | |
|---|---|---|
| CN | 109164457 A | 1/2019 |
| CN | 209894976 U | 1/2020 |
| CN | 110888141 A | 3/2020 |
| CN | 111090082 A | 5/2020 |
| CN | 111142088 A | 5/2020 |

OTHER PUBLICATIONS

Notice of Allowance mailed Apr. 2, 2025, in connection with Chinese Patent Application No. 202011315015.9, 2 pgs. (including translation).

Search Report mailed Mar. 28, 2025, in connection with Chinese Patent Application No. 202011315015.9, 4 pgs. (including translation).

* cited by examiner

━━━━━━━━ Laser beam for long-distance measurement (strong)

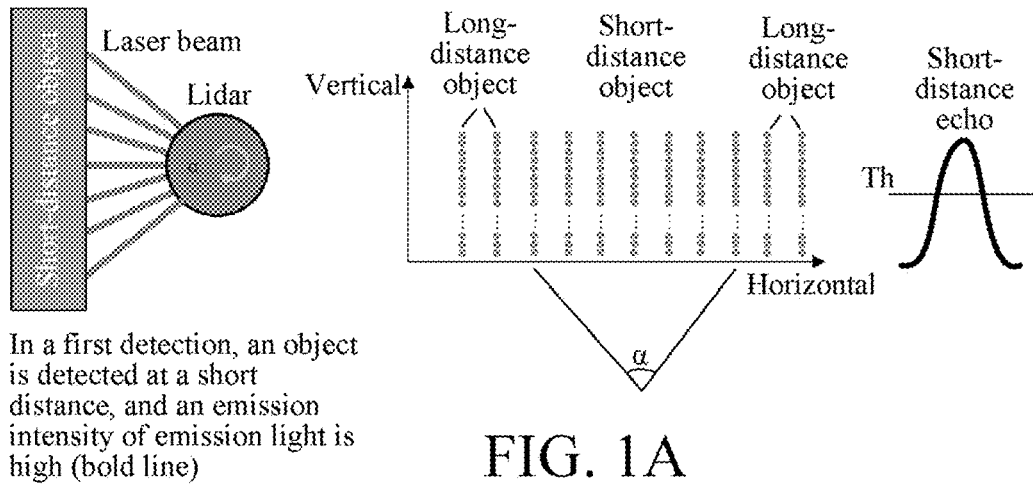

In a first detection, an object is detected at a short distance, and an emission intensity of emission light is high (bold line)

FIG. 1A

············ Laser beam for long-distance measurement (weak)

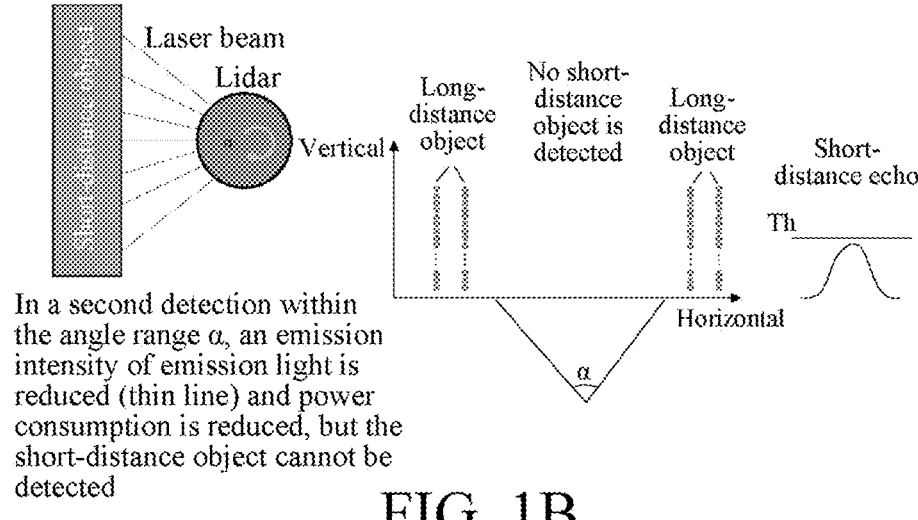

In a second detection within the angle range α, an emission intensity of emission light is reduced (thin line) and power consumption is reduced, but the short-distance object cannot be detected

Long-distance
measurement
emission

Short-distance
measurement
emission

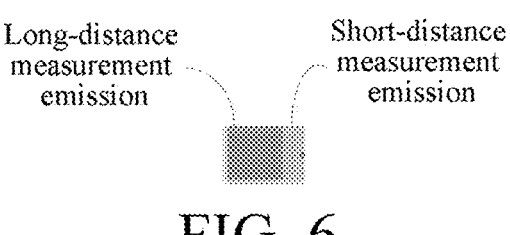

FIG. 6

Short-distance
measurement
emission

Long-distance
measurement
emission

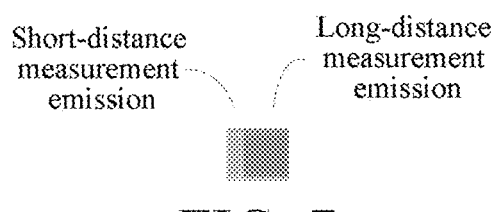

FIG. 7

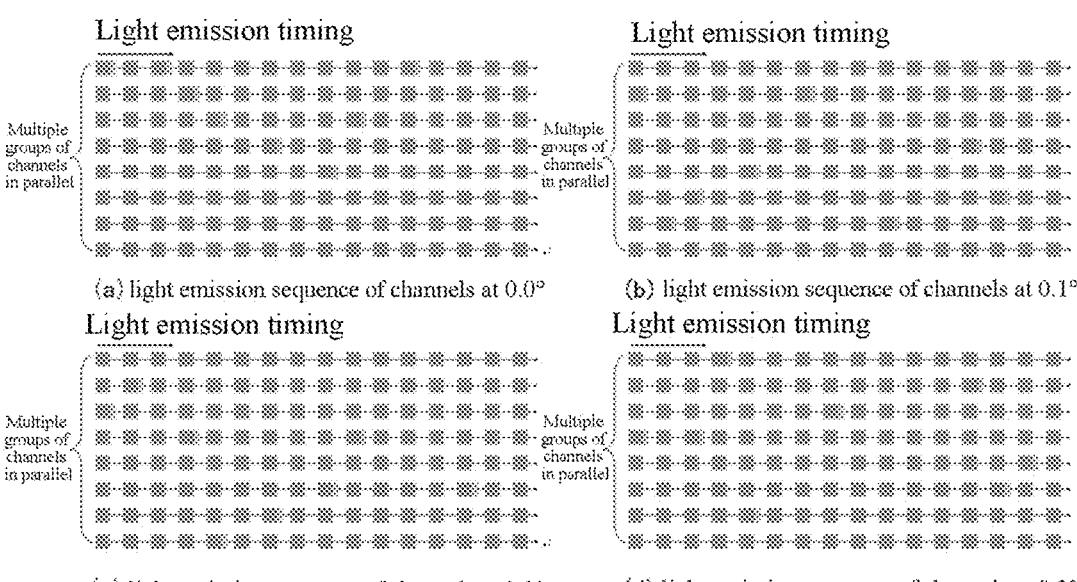

Light emission timing

Multiple
groups of
channels
in parallel (a) light emission sequence of channels at 0.0°

Light emission timing

Multiple
groups of
channels
in parallel (b) light emission sequence of channels at 0.1°

Light emission timing

Multiple
groups of
channels
in parallel (c) light emission sequence of channels at 0.2°

Light emission timing

Multiple
groups of
channels
in parallel (d) light emission sequence of channels at 0.3°

Figure 10A:
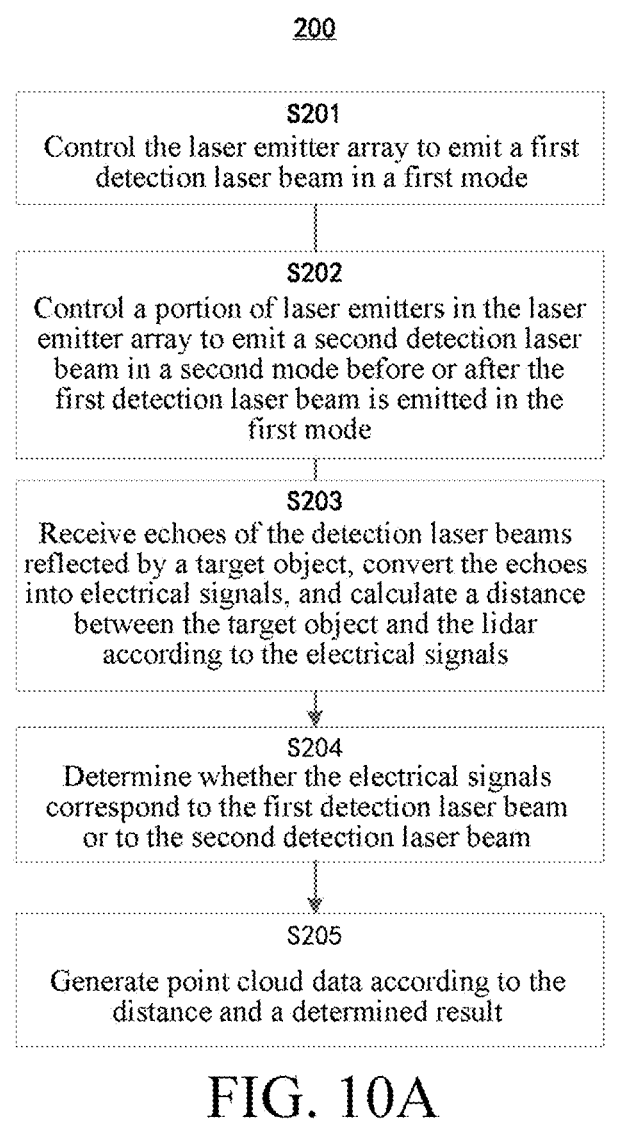

```
┌─────────────────────────────────────────┐
│                  S201                    │
│  Control the laser emitter array to emit │
│  a first detection laser beam in a first │
│                  mode                    │
└─────────────────────────────────────────┘
                     │
┌─────────────────────────────────────────┐
│                  S202                    │
│  Control a portion of laser emitters in  │
│  the laser emitter array to emit a       │
│  second detection laser beam in a second │
│  mode before or after the first          │
│  detection laser beam is emitted in the  │
│                first mode                │
└─────────────────────────────────────────┘
                     │
┌─────────────────────────────────────────┐
│                  S203                    │
│  Receive echoes of the detection laser   │
│  beams reflected by a target object,     │
│  convert the echoes into electrical      │
│  signals, and calculate a distance       │
│  between the target object and the lidar │
│     according to the electrical signals  │
└─────────────────────────────────────────┘
                     │
                     ▼
┌─────────────────────────────────────────┐
│                  S204                    │
│  Determine whether the electrical signals│
│  correspond to the first detection laser │
│  beam or to the second detection laser   │
│                  beam                    │
└─────────────────────────────────────────┘
                     │
                     ▼
┌─────────────────────────────────────────┐
│                  S205                    │
│  Generate point cloud data according to  │
│  the distance and a determined result    │
└─────────────────────────────────────────┘
```

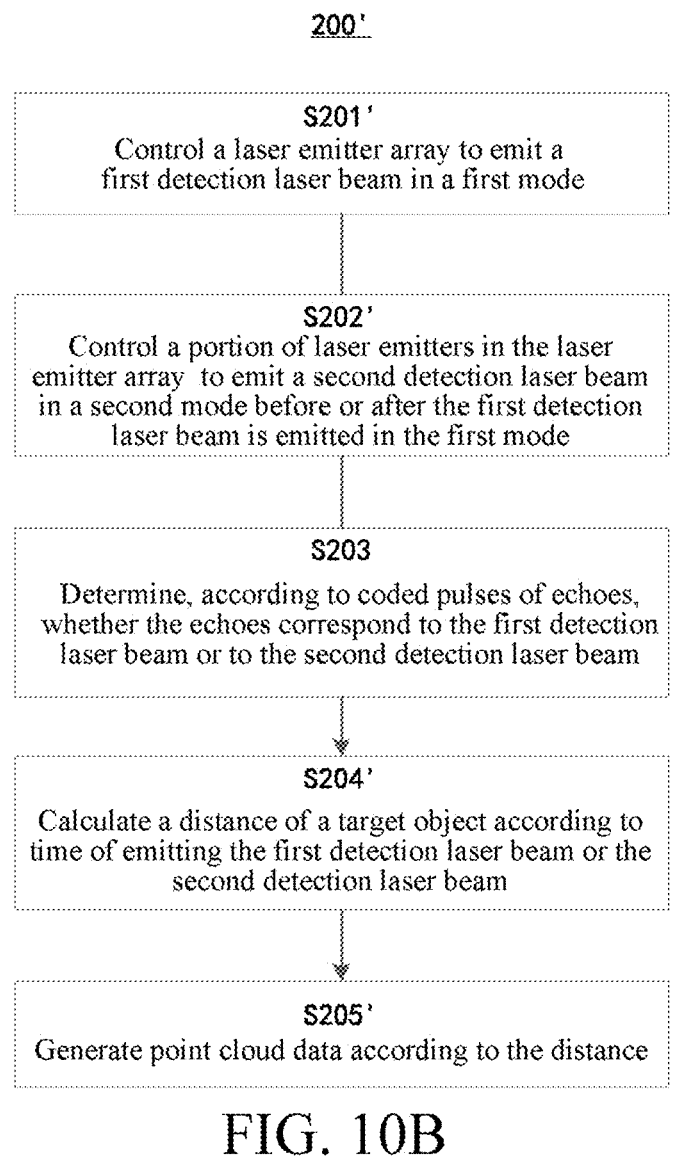

S201'
Control a laser emitter array to emit a
first detection laser beam in a first mode

S202'
Control a portion of laser emitters in the laser
emitter array to emit a second detection laser beam
in a second mode before or after the first detection
laser beam is emitted in the first mode

S203
Determine, according to coded pulses of echoes,
whether the echoes correspond to the first detection
laser beam or to the second detection laser beam

S204'
Calculate a distance of a target object according to
time of emitting the first detection laser beam or the
second detection laser beam

S205'
Generate point cloud data according to the distance

FIG. 10B

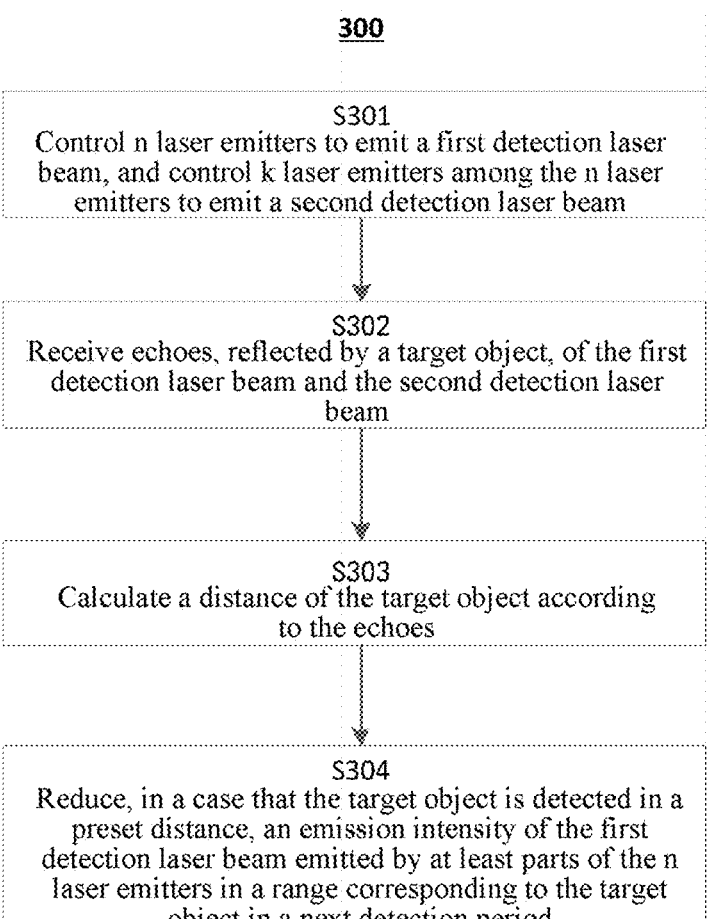

300

S301
Control n laser emitters to emit a first detection laser beam, and control k laser emitters among the n laser emitters to emit a second detection laser beam S302
Receive echoes, reflected by a target object, of the first detection laser beam and the second detection laser beam S303
Calculate a distance of the target object according to the echoes S304
Reduce, in a case that the target object is detected in a preset distance, an emission intensity of the first detection laser beam emitted by at least parts of the n laser emitters in a range corresponding to the target object in a next detection period

FIG. 11

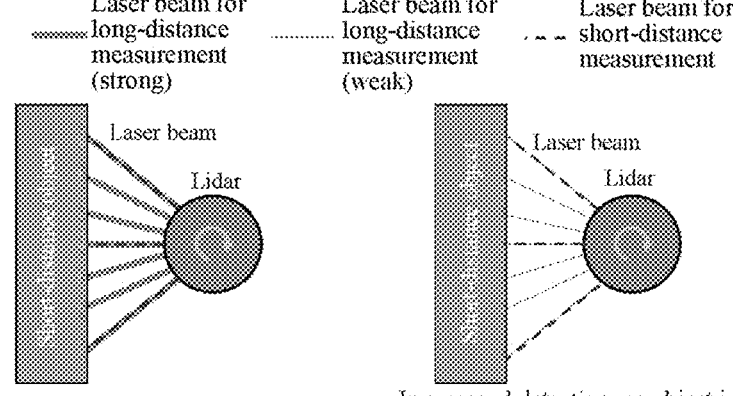

In a first detection, an object is detected at a short distance, and an emission intensity of emission light is high (bold line)

Top view

In a second detection, an object is detected at a short distance, an emission intensity of emission light for long-distance measurement is reduced (thin line) and power consumption is reduced. Light emission for short-distance measurement is not affected, and the short-distance object can still be detected Top view

FIG. 12a

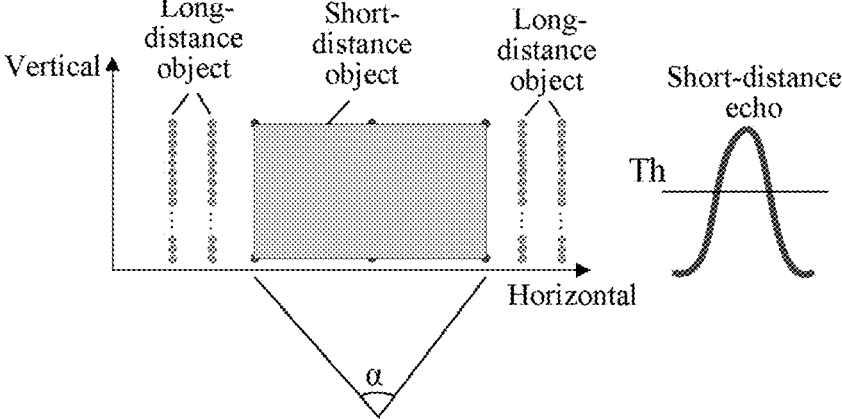

FIG. 12b

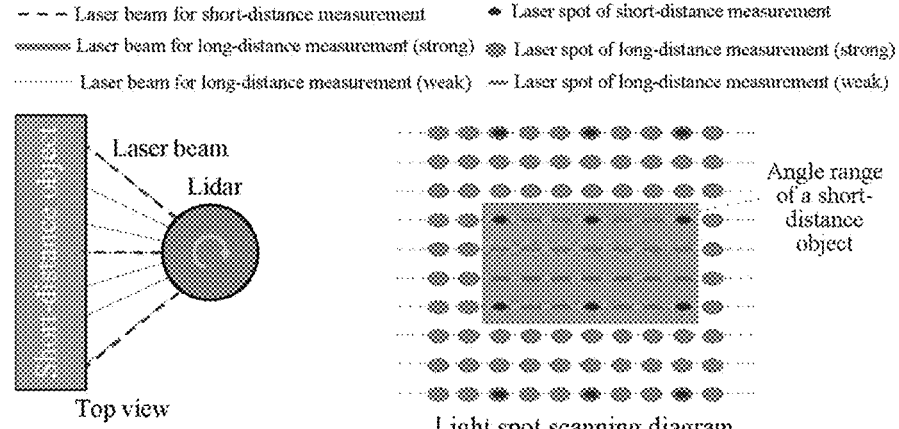

In a second detection, an object is detected at a short distance, an emission
intensity of emission light for long-distance measurement is reduced
(represented by thin lines and little light spots)

FIG. 13a

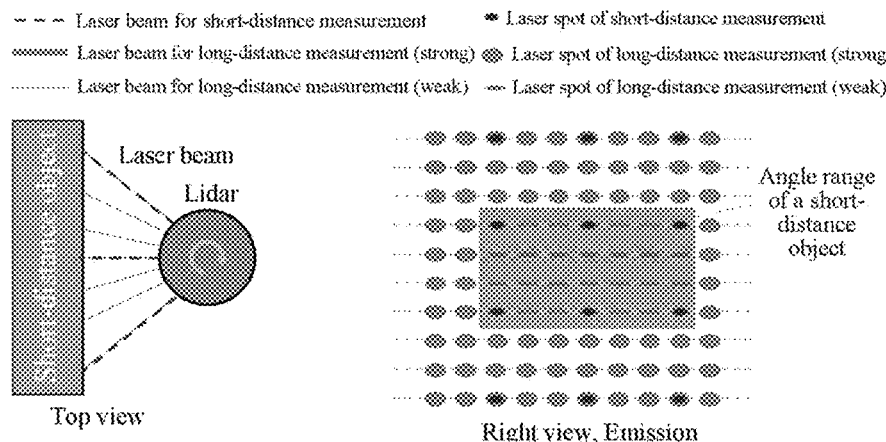

In a second detection, an object is detected at a short distance, the emission
intensity of emission light for long-distance measurement is reduced
(represented by thin lines and little light spots)

FIG. 13b

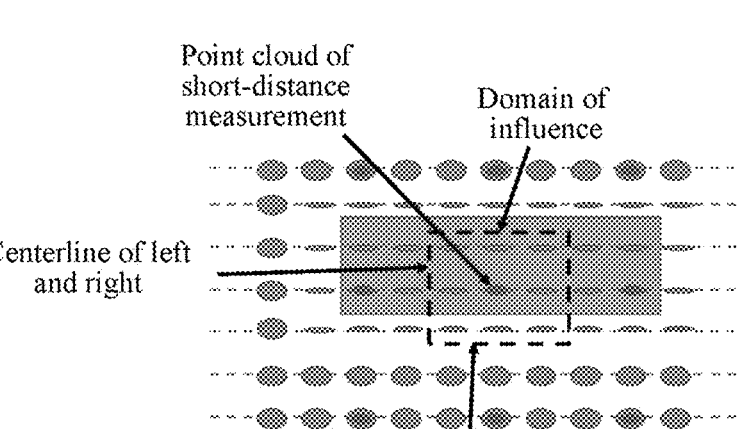

Point cloud of short-distance measurement

Domain of influence

Centerline of left and right

Centerline of up and down

FIG. 15

▬▬▬ Laser beam for long-distance measurement (strong)

· ▬ · ▬ Laser beam for short-distance measurement

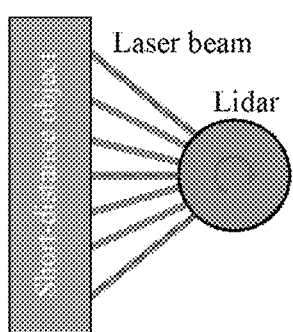

Laser beam

Lidar

In a first detection, an object is detected at a short distance, and a horizontal angular resolution is relatively high (7 lines)

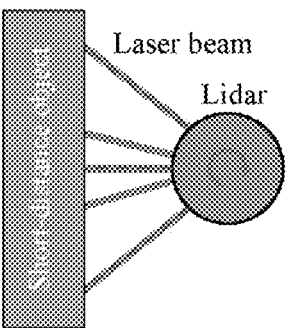

Laser beam

Lidar

In a second detection, an object is detected at a short distance, a quantity of channels of emission light for long-distance measurement is reduced (a horizontal angular resolution is reduced, 5 lines) and power consumption is reduced. Light emission for short-distance measurement is not affected, and the short-distance object can still be detected

FIG. 16

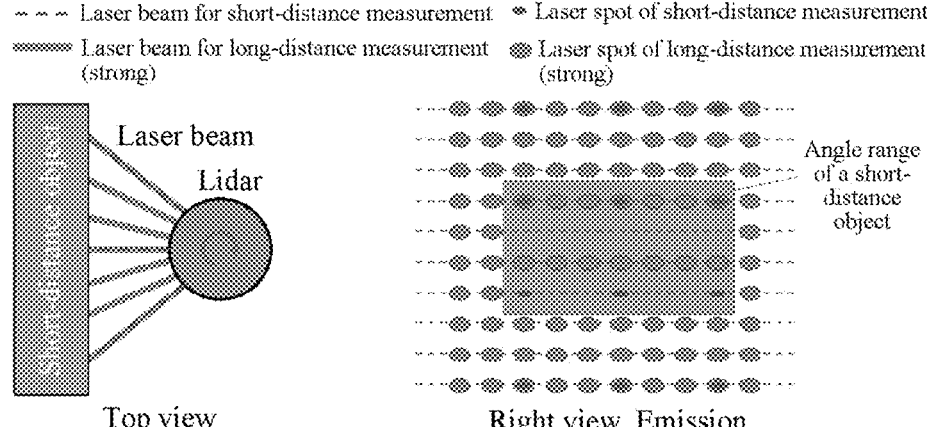

~ ~ ~  Laser beam for short-distance measurement     ❀ Laser spot of short-distance measurement ━━━  Laser beam for long-distance measurement     ❀ Laser spot of long-distance measurement
         (strong)                                                                    (strong)

Laser beam

Lidar

Angle range
of a short-
distance
object

Top view                              Right view, Emission

In a second detection, a vertical resolution is reduced within the
angle range of the short-distance object

FIG. 17

CONTROL METHOD OF LIDAR, AND LIDAR

CROSS-REFERENCE TO RELATED APPLICATIONS

This application is a Continuation of International Patent Application No. PCT/CN2021/106707, filed Jul. 16, 2021, which claims priority from Chinese Patent Application No. 202011315015.9, filed Nov. 20, 2020; the disclosures of all of which are incorporated herein by reference in their entirety.

TECHNICAL FIELD

The present disclosure relates to the field of photoelectric detection technologies, and in particular, to a control method of reducing an emission intensity of a lidar without lowering the short-distance ranging capability and a lidar.

BACKGROUND

Lidar is a generic term of active detection sensors by means of laser. An operating principle of a lidar is generally as follows: an emitter of the lidar emits a laser beam, and the laser beam is diffusely reflected after encountering an object and returned to a laser receiver, a radar module can calculate a distance between the emitter and the object by multiplying a time interval between the emitted signal and the received signal by the speed of light and then dividing the product by 2. According to the quantity of laser beams, there are usually a single-line lidar, a 4-line lidar, an 8/16/32/64-line lidar, and the like. The more lines, the more complicated structure of the lidar, and the higher the integration. For a lidar with high integration, electric power consumption needs to be reduced as much as possible.

During many actual installation and using processes, certain obstacles may exist and be set intentionally in locations close to the lidar. For example, some lines are blocked by a car body at certain horizontal angles. For another example, only a part of horizontal angles of the detection range of the lidar are used, and other angles are blocked. In addition, in an application environment of the lidar, some target objects often appear in locations very close to the lidar (for example, at a distance less than or equal to 3 meters). Detection of these short-distance target objects can be made without the use of an excessively high laser intensity for detection, thereby reducing power consumption. In certain designs for lidars, if an object is detected at a short distance according to a detection result of the lidar, the emission intensity is reduced in the next found of detection when the same angle range is scanned. These designs merely accommodate the requirements of light intensity for short-distance measurement, thereby reducing the power consumption. However, although the emission intensity is reduced according to this strategy, there may be a situation in which the short-distance object cannot be detected.

With reference to FIG. 1A, the emission intensity is high in a first detection and an object is detected at a short distance. With reference to FIG. 1B, when the angle range of the short-distance object is scanned for the second time, the emission intensity is reduced. However, the intensity of echoes reflected by the short-distance object may not reach a threshold Th, which causes that the short-distance object cannot be detected during the scanning for the second time.

Therefore, although the power consumption is reduced, a capability of short-distance ranging is lowered and even lost.

FIG. 1C explains the reason why the capability of short-distance ranging of a lidar with a non-coaxial emitting and receiving structure is lowered and even lost while the power consumption is reduced. A channel is formed by a laser emitter and a detector that are paired according to a field of view at a long distance. As shown in FIG. 1C, for a channel A and a channel B of the lidar, when the lidar is used to detect a long-distance object, after a detection laser beam L0 emitted by the laser emitter in the channel A is reflected by a long-distance target object OB1, the lidar echo is approximated to parallel light and may irradiate a detector D1 in the channel A, as shown in the upper left part of FIG. 1C, which occurs in an ideal situation. When the lidar is used to detect a short-distance target object OB2, after the detection laser beam L0 emitted by the laser emitter in the channel A is reflected by the short-distance target object, the lidar echo cannot be approximated to the parallel light, shift and dispersion of light spots occur when the lidar echo reaches a focal plane on which the detector is located, and the lidar echo may irradiate a detector D2 in the channel B near the detector in the channel A. As shown in the lower left part of FIG. 1C, such shift and dispersion of light spots may cause optical crosstalk between the lidar channels, and become more impactful as the distance decreases. Therefore, the larger quantity of the channels are used for detecting short-distance target objects, the greater the impact is on the ranging precision and accuracy of the lidar.

To prevent ranging inaccuracy due to shift and dispersion of light spots when objects at long and short distances are measured by the same lidar, conventional methods combine lidars for the long-distance measurement and the short-distance measurement. One of the lidars is to measure objects at a long distance, and the other is to measure objects at a short distance. In this way, although the performance of short-distance ranging measurement is improved, system costs are increased, and installation and calibration become more difficult.

The content of "Background" merely represents technologies known to the inventor, and does not necessarily represent prior art in the field.

SUMMARY

The present disclosure provides a control method of reducing an emission intensity of a lidar without lowering a capability of short-distance ranging and a lidar.

The present disclosure provides a control method of a lidar, where the lidar includes a laser emitter array with N laser emitters and the control method includes:

S301: controlling n laser emitters to emit a first detection laser beam, and controlling k laser emitters among the n laser emitters to emit a second detection laser beam, where n is less than or equal to N, the k laser emitters are selected from the n laser emitters, k is less than n, and a light intensity of the first detection laser beam is greater than a light intensity of the second detection laser beam; and S302: receiving echoes, reflected by a target object, of the first detection laser beam and the second detection laser beam;

S303: calculating a distance of the target object according to the echoes; and

S304: reducing, in a case that the target object is detected in a preset distance, an emission intensity of the first detection laser beam emitted by at least parts of the n laser emitters in a range corresponding to the target object in a next detection period.

According to an aspect of the present disclosure, step S304 includes: obtaining an angle range of the target object located in the preset distance according to the distance of the target object, and reducing the emission intensity of the first detection laser beam emitted by laser emitters within the angle range among the n laser emitters in the next detection period.

According to an aspect of the present disclosure, step S304 includes: obtaining the angle range of the target object located in the preset distance according to the distance of the target object, and turning off parts of the n laser emitters within the angle range in the next detection period.

According to an aspect of the present disclosure, p laser emitters and a detector constitute a detection channel, p is greater than or equal to 1, and step S304 includes: controlling, in a case that one detection channel detects the target object located in the preset distance, laser emitters of a detection channel in a preset range around the detection channel to reduce the emission intensity of the first detection laser beam emitted in the next detection period.

According to an aspect of the present disclosure, the preset range is determined according to a centerline between two point clouds of short-distance measurement.

According to an aspect of the present disclosure, step S304 includes: correcting the angle range in the next detection period according to one or more of a type of the target object, a motion parameter, and a detection parameter of the lidar.

According to an aspect of the present disclosure, compared to the second detection laser beam, the first detection laser beam is used for measuring a target object at a longer distance, the N laser emitters are divided into m groups to sequentially emit light, m is an integer and m is greater than 1, and step S301 includes:

controlling the n laser emitters in each group of laser emitter array to emit the first detection laser beam at each horizontal angle of the lidar; and controlling the k laser emitters in the laser emitter array to emit the second detection laser beam at the same horizontal angle before or after the first detection laser beam is emitted.

According to an aspect of the present disclosure, the first detection laser beam and the second detection laser beam have differently-coded pulses; and step S303 includes: determining, according to the differently-coded pulses, whether the echoes correspond to the first detection laser beam or to the second detection laser beam, and calculating the distance of the target object according to time of emitting the first detection laser beam or the second detection laser beam.

According to an aspect of the present disclosure, step S303 includes:

determining, through a time window for receiving the echoes, whether the echoes correspond to the first detection laser beam or to the second detection laser beam, and calculating the distance of the target object according to time of emitting the first detection laser beam or the second detection laser beam.

According to an aspect of the present disclosure, step S303 includes:

calculating a probable distance between the target object and the lidar based on the detected echoes and time of emitting the first detection laser beam and the second detection laser beam respectively; and determining whether the echoes correspond to the first detection laser beam or to the second detection laser beam, and determining the distance of the target object.

The present disclosure further provides a lidar, including:

a laser emitter array with N laser emitters, configured to emit a detection laser beam;

a receiving unit, including a detector array and configured to receive echoes of the detection laser beam reflected by a target object and convert the echoes into electrical signals; and a control unit, coupled to the laser emitter array and the receiving unit, and configured to calculate a distance of the target object according to the electrical signals, control n laser emitters to emit a first detection laser beam, and control k laser emitters among the n laser emitters to emit a second detection laser beam, where n is less than or equal to N, the k laser emitters are selected from the n laser emitters, k is less than n, and a light intensity of the first detection laser beam is greater than a light intensity of the second detection laser beam; and the control unit is configured to reduce, in a case that the target object is detected in a preset distance, an emission intensity of the first detection laser beam emitted by at least parts of the n laser emitters in a range corresponding to the target object in a next detection period.

According to an aspect of the present disclosure, the control unit is configured to: obtain an angle range of the target object located in the preset distance according to the distance of the target object, and reduce the emission intensity of the first detection laser beam emitted by laser emitters within the angle range among the n laser emitters in the next detection period.

According to an aspect of the present disclosure, the control unit is configured to: obtain the angle range of the target object located in the preset distance according to the distance of the target object, and turn off an emission of the first detection laser beam emitted by parts of the n laser emitters within the angle range in the next detection period.

According to an aspect of the present disclosure, p laser emitters and a detector constitute a detection channel, p is greater than or equal to 1, and the control unit is configured to: control, in a case that one detection channel detects the target object located in the preset distance, laser emitters of a detection channel in a preset range around the detection channel to reduce the emission intensity of the first detection laser beam emitted in the next detection period.

According to an aspect of the present disclosure, the preset range is determined according to a centerline between two point clouds of short-distance measurement.

According to an aspect of the present disclosure, the control unit is configured to: according to the distance of the target object output by the control unit, obtain the angle range of the target object located in the preset distance, and reduce the emission intensity of a long-distance measurement mode of laser emitters within the angle range and a preset range near the angle range in the next detection period.

According to an aspect of the present disclosure, the control unit is configured to: correct the angle range in the next detection period according to one or more of a type of the target object, a motion parameter, and a detection parameter of the lidar.

According to an aspect of the present disclosure, compared to the second detection laser beam, the first detection laser beam is used for measuring a target object at a longer distance, the N laser emitters are divided into m groups to sequentially emit light, m is an integer and m is greater than 1, and the control unit is configured to: control the n laser emitters in each group of laser emitter array to emit the first detection laser beam at each horizontal angle of the lidar; and control the k laser emitters in the laser emitter array to emit the second detection laser beam at the same horizontal angle before or after the first detection laser beam is emitted.

According to an aspect of the present disclosure, the first detection laser beam and the second detection laser beam have differently-coded pulses; and the control unit is configured to: determine, according to the differently-coded pulses, whether the echoes correspond to the first detection laser beam or to the second detection laser beam, and calculate the distance of the target object according to time of emitting the first detection laser beam or the second detection laser beam.

According to an aspect of the present disclosure, the control unit is configured to: determine, through a time window for receiving the echoes, whether the echoes correspond to the first detection laser beam or to the second detection laser beam, and calculate the distance of the target object according to time of emitting the first detection laser beam or the second detection laser beam.

According to an aspect of the present disclosure, the control unit is configured to: calculate a probable distance between the target object and the lidar based on the detected echoes and time of emitting the first detection laser beam and the second detection laser beam respectively; and determine whether the echoes correspond to the first detection laser beam or to the second detection laser beam, and determine the distance of the target object.

The present disclosure further provides a computer-readable storage medium, including computer-executable instructions stored on the computer-readable storage medium, where the computer-executable instructions, when executed by a processor, implement the control method described above.

BRIEF DESCRIPTION OF THE DRAWINGS

The accompanying drawings forming a part of the present disclosure are used to provide further understanding of the present disclosure. Exemplary embodiments and description of the present disclosure are used to explain the present disclosure, and do not constitute an inappropriate limitation on the present disclosure. In the accompanying drawings:

FIG. 1A and FIG. 1B show schematic diagrams of a strategy adopted by a lidar of reducing an emission intensity when an object exists at a short distance;

FIG. 6 shows light emission timing of a first mode and a second mode according to an embodiment of the present disclosure;

FIG. 7 shows light emission timing of a first mode and a second mode according to another embodiment of the present disclosure;

FIG. 8 shows logic arrangement (light emission timing) of a laser emitter array at adjacent horizontal angles according to an embodiment of the present disclosure;

FIG. 10A shows a schematic diagram of a ranging method using a lidar according to an embodiment of the present disclosure;

FIG. 10B shows a schematic diagram of a ranging method using a lidar according to another embodiment of the present disclosure;

FIG. 11 shows a flowchart of a control method of a lidar according to an embodiment of the present disclosure;

FIG. 12a shows a schematic diagram of a light intensity of a lidar according to a second aspect of the present disclosure;

FIG. 12b shows a schematic diagram of a point cloud of a lidar adopting the scheme of FIG. 12a;

FIG. 13a and FIG. 13b show schematic diagrams of a first detection and a second detection of a lidar according to an embodiment of the present disclosure;

FIG. 15 shows a schematic diagram of division of a domain of influence according to an embodiment of the present disclosure;

FIG. 16 shows a schematic diagram of reducing a horizontal angular resolution of detection according to an embodiment of the present disclosure; and FIG. 17 shows a schematic diagram of reducing a vertical angular resolution of detection according to an embodiment of the present disclosure.

DETAILED DESCRIPTION

Figure 1C:
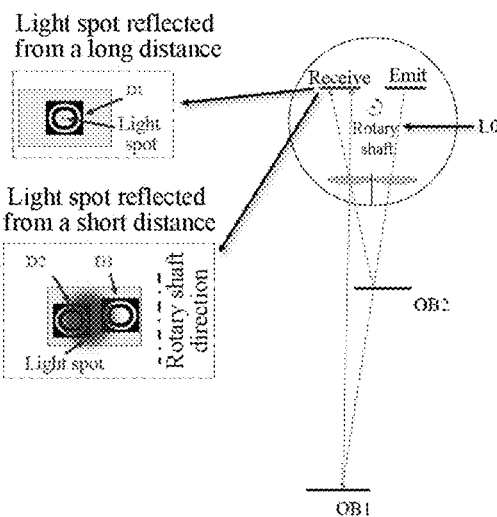
FIG. 1C explains the reason why a capability of short-distance ranging is lowered and even lost at the same time when power consumption is reduced.

Only certain exemplary embodiments are briefly described below. As those skilled in the art can realize, the described embodiments may be modified in various different ways without departing from the spirit or the scope of the present disclosure. Therefore, the accompanying drawings and the description are to be considered as illustrative in nature but not restrictive.

In the description of the present disclosure, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that a device or an element must have a particular direction or must be constructed and operated in a particular direction, and therefore, cannot be understood as a limitation on the present disclosure. In addition, the terms "first" and "second" are used merely for the purpose of description, and shall not be construed as indicating or implying relative importance or implicitly indicating a quantity of technical features indicated. Therefore, features defined by "first" and "second" may explicitly or implicitly include one or more of the features. In the description of the present disclosure, unless otherwise explicitly specified, "a plurality of" means two or more than two.

In the description of the present disclosure, it should be noted that, unless otherwise specified or defined, the terms such as "mount", "connect", and "connection" should be understood in a broad sense, for example, the connection may be a fixed connection, a detachable connection, or an integral connection; or the connection may be a mechanical connection, or may be an electrical connection or communication with each other; or the connection may be a direct connection, an indirect connection through an intermediary, or internal communication between two components or mutual interaction relationship between two components. The specific meanings of the above terms in the present disclosure may be understood according to specific circumstances for a person of ordinary skill in the art.

In the present disclosure, unless otherwise explicitly stipulated and restricted, that a first feature is "on" or "under" a second feature may include that the first and second features are in direct contact, or may include that the first and second features are not in direct contact but in contact by using other features therebetween. In addition, that the first feature is "on", "above", or "over" the second feature includes that the first feature is right above and obliquely above the second feature, or merely indicates that a horizontal height of the first feature is higher than that of the second feature. That the first feature is "below", "under", or "beneath" the second feature includes that the first feature is right below and obliquely below the second feature, or merely indicates that a horizontal height of the first feature is lower than that of the second feature.

Many different implementations or examples are provided in the following disclosure to implement different structures of the present disclosure. To simplify the disclosure of the present disclosure, components and settings in specific examples are described below. Certainly, they are merely examples and are not intended to limit the present disclosure. In addition, in the present disclosure, reference numerals and/or reference letters may be repeated in different examples. The repetition is for the purposes of simplification and clearness, and does not indicate a relationship between various implementations and/or settings discussed. Moreover, the present disclosure provides examples of various specific processes and materials, but a person of ordinary skill in the art may be aware of application of another process and/or use of another material.

Preferred embodiments of the present disclosure are described below in detail with reference to the accompanying drawings. It should be understood that the preferred embodiments described herein are merely used to explain the present disclosure but are not intended to limit the present disclosure.

First Aspect

A first aspect of the present disclosure relates to a laser emitting unit, for example, an emitting unit that can be used in a lidar. Details are described below with reference to the accompanying drawings.

Figure 2:
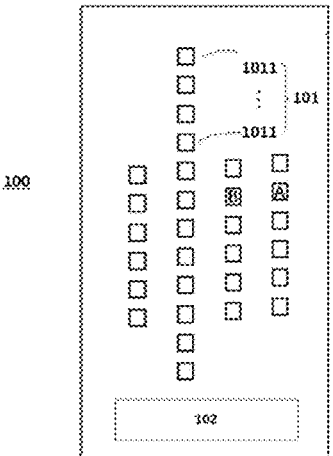
FIG. 2 shows a schematic diagram of an emitting unit of a lidar according to an embodiment of the present disclosure.
Figure 3:
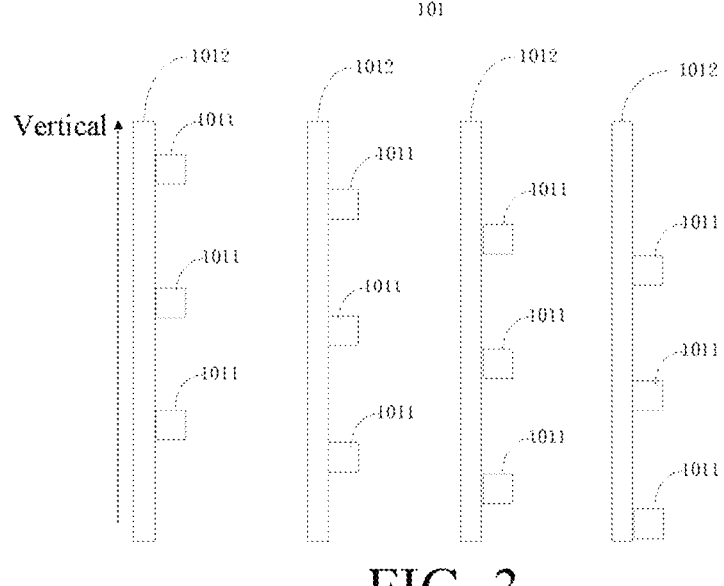
FIG. 3 shows a schematic diagram of a laser emitter array according to an embodiment of the present disclosure.

As shown in FIG. 2, an emitting unit 100 includes a laser emitter array 101 and a control unit 102. The laser emitter array 101 includes a plurality of laser emitters arranged on one or more substrates, and each laser emitter may be independently driven to emit light. FIG. 2 schematically shows a schematic diagram of the arrangement of the plurality of laser emitters included in the laser emitter array 101 on a substrate (for example, a circuit board). The laser emitter array 101, for example, includes four columns of laser emitters, which, in total, have 30 laser emitters. A person skilled in the art may easily understand that the present disclosure is not limited thereto. The laser emitter array 101 may include a larger or lesser quantity of laser emitters, and the physical arrangement of the laser emitters may be freely set according to requirements, for example, it may also be conceived that the plurality of laser emitters are arranged on a plurality of substrates as shown in FIG. 3. According to an embodiment of the present disclosure, the emitting unit 100 further includes an emitting lens (not shown) configured to modulate (collimate) laser beams emitted by the laser emitters into parallel beams and emit the parallel beams to an environmental space around the lidar. The laser emitters in the laser emitter array 101 are preferably located at different heights of a focal plane of the emitting lens, and correspond to different vertical fields of view after being emitted from the emitting lens.

FIG. 3 shows a laser emitter array 101 according to another embodiment of the present disclosure. The laser emitter array 101 includes a plurality of substrates 1012 and laser emitters 1011 arranged on each of the substrates 1012. Each laser emitter 1011 is located at a different height of the focal plane of the emitting lens and respectively corresponds to a different vertical field of view of the lidar.

As shown in FIG. 2, the control unit 102 is coupled to the laser emitter array 101, and is configured to control the laser emitters in the laser emitter array 101 to emit light. The control unit 102 may include a high-voltage unit and a logic control unit. The high-voltage unit is configured to generate a high voltage required for driving the laser emitters to emit light, and the logic control unit is configured to control light emission timing and logic of the laser emitter array 101. Detailed description is given below.

According to an embodiment, the lidar of the present disclosure is angularly triggered, and implements one complete ranging process at each horizontal angle of the lidar. For example, a horizontal angular resolution of the lidar is 0.2°, and the lidar is angularly triggered at each horizontal angle, i.e., every 0.2°, that is, at 0°, 0.2°, 0.4°, . . . , etc starting from 0°, to implement one complete ranging process. Taking a rotation speed of 10 Hz, a horizontal angular resolution of 0.2°, and a measurement distance of 200 m as an example, the time of flight of one measurement is 1.34 us, and a rotation by 0.2° takes 55.6 us. Thus, a maximum of 41 (55.6/1.34=41.5) times of light emission and reception is allowed within such a time period. For a lidar having a medium or large quantity of lines, such as a 64-line lidar or 128-line lidar, a plurality of channels are required to simultaneously emit light to accommodate requirements of a high horizontal angular resolution and long-distance measurement. In addition, the higher the horizontal angular resolution is and the longer the measurement distance is, the larger the quantity of channels are required to simultaneously emit light. The inventor of the present disclosure discovers that in a lidar having a large quantity of lines, the channels are densely arranged, and the more the channels emitting light simultaneously are, the more likely optical crosstalk may occur. Although the impact of the optical crosstalk on detection of a target object at a relatively long distance is acceptable, when a target object at a short distance is measured, mutual interference between channels is very severe. It can be seen from a point cloud that the ranging of the target object is inaccurate and the channel consistency is poor in a short-distance measurement.

Figure 4A:
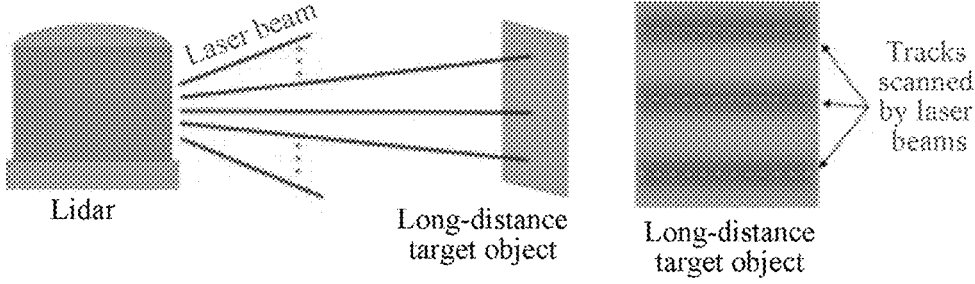
FIG. 4A shows tracks scanned by each laser beam of a lidar on a long-distance target object.
Figure 4B:
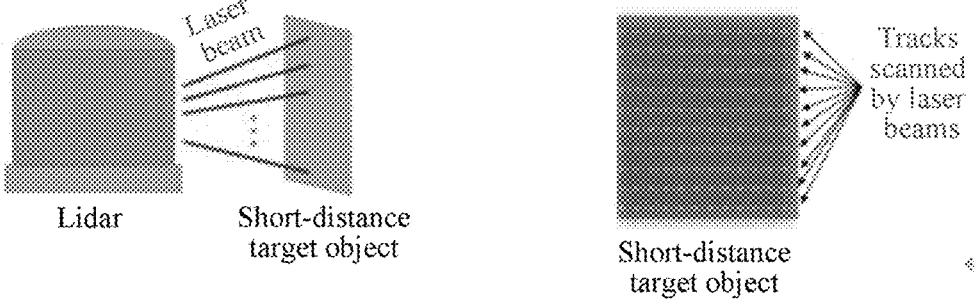
FIG. 4B shows a schematic diagram of overlapping and redundancy of light spots of a lidar on a short-distance target object.

As shown in FIG. 4A and FIG. 4B, in a measurement for a short-distance target object, when all channels of the lidar with a large quantity of lines are activated for detection, both the vertical angular resolution and horizontal angular resolution are excessive. As shown in FIG. 4A, different laser beams of the lidar are radially emitted. Therefore, in a measurement for a long-distance target object, laser spots scanning on the target object can be clearly separated due to a relatively long distance. Because the distance is long, laser beams reflected to the lidar are substantially parallel beams, and locations of the light spots on the focal plane are less affected by the distance. Therefore, when the long-distance object is scanned, all channels and maximum performance of the lidar can be utilized to the greatest extent. On the other hand, in the measurement for a short-distance target object, a distance of radial emission of the laser beams is short, so that tracks scanned by the laser beams on the target object are dense, and therefore serious overlapping and redundancy of light spots exist. In addition, due to the shift and dispersion of light spots at a short distance, not only parts of the laser beams are wasted, the measurement precision of the lidar is also affected.

Therefore, according to this embodiment of the present disclosure, the control unit 102 may be configured to emit light in a first mode by using a larger quantity of laser emitters, to improve the resolution of the long-distance target object; and emit light in a second mode by using a lesser quantity of channels to measure the short-distance target object, where the channels that simultaneously emit light during short-distance measurement are as few as possible, and preferably, a single channel is used to reduce the interference between the channels that simultaneously emit light, so that the precision of the short-distance measurement is greatly improved. Specifically, the first mode includes: controlling n laser emitters in the laser emitter array 101 to emit light, where n is less than or equal to N, and N is a total quantity of the laser emitters in the laser emitter array. The second mode includes: controlling k laser emitters in the laser emitter array to emit light, where the k laser emitters are selected from the n laser emitters, and k is less than n. Preferably, n is equal to the total quantity N of the laser emitters in the laser emitter array, the second mode is single-channel light emission, the n laser emitters simultaneously emit light, and the k laser emitters also simultaneously emit light. In an embodiment of the present disclosure, for example, the total quantity of the laser emitters in the laser emitter array 101 is eight (N=8). In the first mode, the eight laser emitters in the laser emitter array 101 are controlled to emit light, and preferably, the eight laser emitters simultaneously emit light. In the second mode, two laser emitters in the laser emitter array 101 are controlled to emit light, preferably the two laser emitters simultaneously emit light, or preferably in the second mode, one laser emitter in the laser emitter array 101 is controlled to emit light in a single channel, to further reduce channel crosstalk.

In an embodiment of the present disclosure, the first mode includes: controlling the n laser emitters in the laser emitter array to emit light at each horizontal angle of the lidar. The second mode includes: controlling the k laser emitters in the laser emitter array to emit light at the same horizontal angle as that in the first mode. For example, the horizontal angular resolution of the lidar described above is 0.2°, and the lidar is angularly triggered at each horizontal angle, i.e., every 0.2°, that is, at 0°, 0.2°, 0.4°, . . . , etc starting from 0°. In other words, the laser emitter array 101 performs light emission ranging in the first mode and the second mode at 0°, 0.2°, 0.4°, . . . , etc. Certainly, the horizontal angular resolution of the lidar may be 0.1° or other values, which may be set according to detecting requirements.

The first mode and the second mode are briefly described above merely by using an example in which the laser emitter array 101 includes eight laser emitters. The lidar having a large quantity of lines may usually have 40, 64, 128, or more lines. The lidar having a large quantity of lines usually needs to be divided into several groups to sequentially emit light due to restriction of the detection distance and the horizontal angular resolution, and each group of laser emitter array represents a subgroup of the laser emitter array.

According to an exemplary embodiment of the present disclosure, the laser emitter array is divided into m groups to sequentially emit light, where m is an integer and m is greater than 1. The control unit is configured to control each group of the laser emitter array to emit a first detection laser beam in the first mode, and is configured to control the each group of the laser emitter array to emit a second detection laser beam in the second mode before or after the first detection laser beam is emitted in the first mode. The m subgroups of the laser emitter array all emit light according to the mode at each horizontal angle of the lidar. Preferably, for the m subgroups, operational sequences of the first mode and the second mode are identical. For example, for each of the m subgroups, it initially performs the first mode and then performs the second mode subsequently. The term "m groups sequentially emit light" refers to operations according to a chronological order, i.e. operation of a next group is performed after operation of a previous group is completed. Preferably, in each of the m subgroups of the laser emitter array, the laser emitter may simultaneously emit light in the first mode, and the laser emitter may simultaneously emit light in the second mode. According to an embodiment of the present disclosure, if a quantity m of the groups is relatively large, a quantity of laser emitters emitting light in the second mode in a portion of the m subgroups of the laser emitter array may be equal to 0.

Details are described below with reference to the accompanying drawings.

Figure 5:
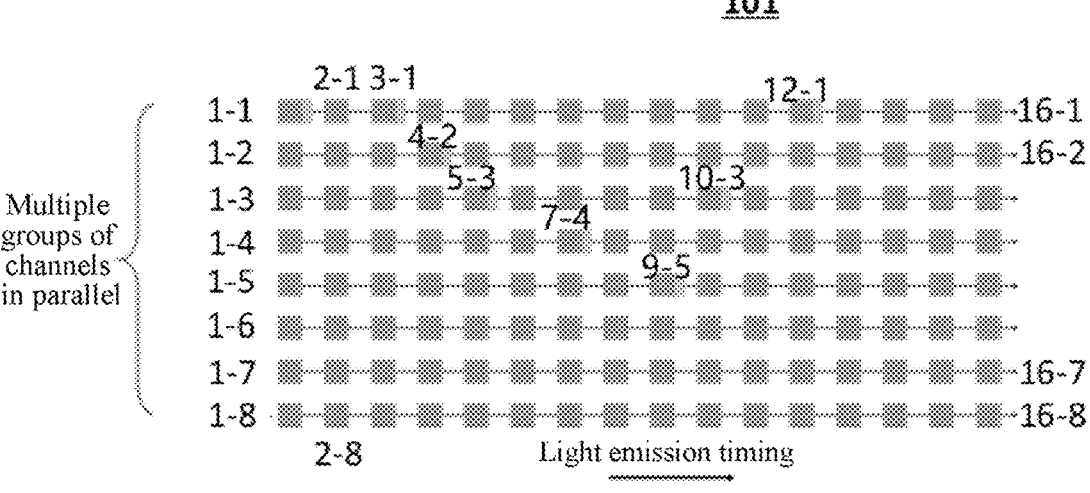
FIG. 5 shows logic arrangement (light emission timing) of a plurality of laser emitters in a laser emitter array according to an embodiment of the present disclosure.

FIG. 5 shows logic arrangement (light emission timing) of a plurality of laser emitters in a laser emitter array 101. A description is made by using an example in which the laser emitter array 101 includes 128 laser emitters. Generally, for a lidar having a large quantity of lines, the plurality of laser emitters need to emit light in parallel when the light emission timing is controlled. As shown in FIG. 3, the 128 laser emitters may be divided into 16 groups, and 8 laser emitters in each group simultaneously emit light for 16 times in total to complete the emission of the 128 laser emitters. In FIG. 5, a horizontal direction refers to a timing sequence of light emission. The laser emitters are divided into 16 groups, and each group includes 8 laser emitters. For convenience, 8 laser emitters emitting light at a first timing are numbered 1-1, 1-2, . . . , 1-7, and 1-8, 8 laser emitters emitting light at a sixteenth timing are numbered 16-1, 16-2, . . . , 16-7, and 16-8, and laser emitters emitting light at other timings are numbered similarly. Details are not described herein again. The 128 laser emitters are triggered at the same horizontal angle.

According to an embodiment of the present disclosure, the laser emitter array 101 is a laser emitter array formed by individual laser emitters or laser emitters in one-dimensional arrays or laser emitters in two-dimensional arrays, and the laser emitter includes an edge-emitting laser emitter or a vertical-cavity surface-emitting laser emitter, or a combination of the edge-emitting laser emitter and the vertical-cavity surface-emitting laser emitter.

A person skilled in the art may easily understand that, in FIG. 5, the laser emitters are numbered and arranged according to a light emission logic sequence, and the numbering may be identical to those in the physical arrangement of the laser emitters in FIG. 2 and FIG. 3, or may be different. For example, two laser emitters that are in the same column in FIG. 2 may have different light emission timings in FIG. 5, which all fall within the protected scope of the present disclosure.

In the present disclosure, the first mode and the second mode are relative terms, where a quantity of laser emitters used in the first mode is greater than a quantity of laser emitters used in the second mode. According to an exemplary embodiment of the present disclosure, the first mode is a long-distance measurement mode in which all laser emitters in the laser emitter array 101 are alternately activated to emit light for detection. The second mode is a short-distance measurement mode in which a portion of the laser emitters in the laser emitter array 101 are alternately activated to emit light for detection. A person skilled in the art may easily understand that, even in the first mode, instead of alternatively activating all laser emitters to emit light, a portion of the laser emitters may also be activated to emit light (that is, n is less than N) as long as the quantity of the laser emitters in the first mode is greater than the quantity of the laser emitters in the second mode. For convenience and clarity, a description is made below by using an example in which all laser emitters are activated to emit light in the first mode.

According to this embodiment of the present disclosure, the control unit 102 may control the k laser emitters in the laser emitter array, so that the k laser emitters emit the second detection laser beam in the second mode before or after the first detection laser beam is emitted in the first mode. The control unit 102 may implement a pre-established method to select or randomly select the k laser emitters emitting in the second mode, and the k laser emitters emit light in the second mode before or after emitting light in the first mode.

FIG. 5 shows a situation in which emission in a second mode is performed after emission in a first mode. Eight laser emitters are selected from the emitting unit including 128 laser emitters shown in FIG. 5, and are respectively numbered 1-1, 3-1, 4-2, 5-3, 7-4, 9-5, 10-3, and 12-1. During normal long-distance measurement (the first mode), the eight laser emitters will be reactivated for another short-distance measurement emission (the second mode) after completing long-distance measurement. FIG. 6 shows long-distance measurement emission and short-distance measurement emission of one of the laser emitters, where blocks with green color represent time windows of the light emission for long-distance measurement, and blocks with yellow color represent time windows of the light emission for short-distance measurement. Therefore, 8 times of short-distance measurement emission are added when 128 channels sequentially emit light to perform long-distance measurement. In addition, each short-distance measurement emission is preferably single-channel light emission, that is, only one laser emitter emits light in the second mode at the same timing.

In addition, the quantity of the portion of laser emitters selected is not limited in the present disclosure. FIG. 5 shows 8 laser emitters for emitting the second detection laser beam. The specific quantity may be greater than or less than 8, which is determined according to an expected horizontal angular resolution for short-distance measurement. In addition, the portion of laser emitters in the second mode may be preset, or may be generated in real time. For example, for the 8 laser emitters at each light emission timing in FIG. 5, one laser emitter may be randomly selected to perform emission in the second mode, which all fall within the protected scope of the present disclosure.

FIG. 5 and FIG. 6 show that for the k laser emitters, emission in the second mode is performed after emission in the first mode. Alternatively, as shown in FIG. 7, the emission in the second mode may also be performed before the emission in the first mode. The k laser emitters first emit light in the second mode to detect the short-distance target object before emitting light in the first mode. Details are not described herein again.

In an embodiment of the present disclosure, a long-distance measurement mode (that is, a ranging result is used for providing three-dimensional point cloud data of lidar long-distance measurement) is adopted when a distance between the target object and the lidar is in a range of 5 m to 200 m, and the quantity of the laser emitters emitting light in the long-distance measurement mode is large; and a short-distance measurement mode (where a ranging result is used for providing three-dimensional point cloud data of lidar short-distance measurement) is adopted when a distance between the target object and the lidar is less than 5 m, and the quantity of the laser emitters emitting in the short-distance measurement mode is small. The present disclosure is not limited to the foregoing specific values, but may be modified and adjusted according to specific situations. For example, a preset value for the distance is determined according to a degree of light spot shift and dispersion that vary with distance and is further determined according to parameters of lenses of the lidar, and the capability of a system to recognize an output signal of a detector. The setting of the preset value for the distance is used as a reference for the lidar to output the three-dimensional point cloud data, and details are described below.

According to an exemplary embodiment of the present disclosure, to distinguish the first detection laser beam emitted in the first mode and the second detection laser beam emitted in the second mode, the first detection laser beam and the second detection laser beam may have differently-coded pulses. For example, both the first detection laser beam and the second detection laser beam may use dual pulses. However, the dual pulses of the first detection laser beam and the second detection laser beam have different time intervals for encoding, so that whether the echo pulses correspond to the first detection laser beam or to the second detection laser beam can be distinguished according to an interval of the echo pulses. Preferably, the first detection laser beam and the second detection laser beam may use three pulses.

In addition, the first detection laser beam and the second detection laser beam may alternatively be distinguished according to signals read in different time windows reserved by the detectors corresponding to each channel. For example, for a situation that the second mode is performed after the first mode, if the first detection laser beam in the first mode is configured to perform long-distance measurement, the detector reserves a long first time window (after the laser emitter in the channel emits light in the first mode) for the reception of echoes of the first detection laser beam reflected from the target object. After the long-distance measurement is completed in the first mode, the detector reserves a short second time window for the reception of echoes of the second detection laser beam in the short-distance measurement performed in the second mode. Therefore, the first detection laser beam and the second detection laser beam are distinguished according to signals read at the first time window and the second time window of the detectors at the channels. Then, a time of flight TOF is obtained according to a time point when the first detection laser beam or the second detection laser beam is emitted, and a distance between the target object and the lidar may be obtained by multiplying the time of flight by a speed of light c and then dividing the product by 2. A long-distance measurement mode is that, for example, the distance between the target object and the lidar is greater than 3 meters, corresponding to the TOF time (time window) with a duration t greater than 20 ns; and a short-distance measurement mode is that, for example, the distance between the target object and the lidar is less than or equal to 3 meters, corresponding to the TOF time (time window) with a duration t less than or equal to 20 ns.

According to another embodiment of the present disclosure, a probable distance between the target object and the lidar may be calculated based on the detected echoes and time of emitting the first detection laser beam and the second detection laser beam respectively. Then, whether the echoes signal correspond to the first detection laser beam or to the second detection laser beam is determined (for example, it may be determined according to an expected detection distance specifically corresponding to each detection laser beam), and the distance of the target object is determined from two probable distances.

The lidar generally includes a rotary shaft and may rotate around the rotary shaft in a plane. For convenience, the description is given using an orientation at which the lidar is vertically installed. In other words, the rotary shaft is installed in a vertical direction, the lidar may rotate in a horizontal plane, and the laser emitter is driven to emit detection laser beams during the rotation. The lidar has a specific angular resolution such as 0.1° or 0.2°, and the detection laser beams are emitted at each horizontal angle of the lidar (for example, using the horizontal angular resolution of the lidar as an interval). FIG. 8 shows that the angular resolution of the lidar is 0.1°, that is, a detection is performed every 0.1°.

According to an exemplary embodiment of the present disclosure, the first mode includes: controlling the n laser emitters in the laser emitter array to emit light at each horizontal angle of the lidar. The second mode includes: controlling a portion of the laser emitters in the laser emitter array to emit light at the same horizontal angle as that in the first mode. As shown in FIG. 8(a) to FIG. 8(d), at each horizontal angle of the lidar, in addition to performing light emission detection in the first mode, light emission detection in the second mode is also performed by using the k laser emitters.

As shown in FIG. 8, 128 laser emitters are divided into 16 groups to emit light, and each group of laser emitter array (that is a subgroup of the laser emitter array) includes 8 laser emitters. In the first mode, n laser emitters in each group of laser emitter array are controlled to emit light, and a maximum value of n is a total quantity of the laser emitters in each group of laser emitter array (subgroup of the laser emitter array). For example, 8 laser emitters in the group are all controlled to emit light in the first mode, and then only a small quantity of laser emitters (for example, one laser emitter) in each group of laser emitter array are controlled to emit light in the second mode, and operation of a next group is performed in a chronological order after operation of a previous group is completed. Taking FIG. 8(a) as an example, laser emitters in the second mode are numbered 1-1, 3-1, 4-2, 5-3, 7-4, 9-5, 10-3, and 12-1 (referring to FIG. 5), and all laser emitters in the second mode are selected from different groups, to further reduce a probability of optical crosstalk. In this implementation, 128 laser emitters are uniformly divided, or may certainly be non-uniformly divided according to actual situations. In other words, the quantity of laser emitters in each group of laser emitter array may be different.

In addition, preferably, the portion of laser emitters emitting the second detection laser beam at two adjacent horizontal angles of the lidar are different from each other, and the second mode circulates by taking s horizontal angles of the lidar as a period, where s is an integer greater than or equal to 2. As shown in FIG. 8(a), the portion of laser emitters with an angular resolution of 0.0° are respectively numbered 1-1, 3-1, 4-2, 5-3, 7-4, 9-5, 10-3, and 12-1. As shown in FIG. 8(b), and the portion of laser emitters with an angular resolution of 0.1° are respectively numbered 1-2, 2-7, 3-6, 5-5, 7-2, 10-7, 13-4, and 14-6. The portion of laser emitters that emit light with angular resolutions of 0.0° and 0.1° in the second mode do not coincide. In a method for selecting laser emitters in the second mode, it is ensured, to the greatest extent possible, that laser emitters at different positions among the 128 laser emitters are fully used in batches as much as possible, so that the field of view and the resolution of short-distance detection can be fully ensured.

The 128-line lidar shown in FIG. 8 is used as an example, 8 channels simultaneously emit light for 16 times in total, and the horizontal angular resolution is 0.1°. During normal long-distance measurement, one short-distance measurement is added after the long-distance measurement is completed in certain specific channels, 8 times of short-distance measurement are added each time the 128 channels sequentially emit light to perform long-distance measurement, and each short-distance measurement is preferably single-channel light emission. 8 different short-distance measurement channels are selected in four resolutions of 0.1°, so that 32 times of emission and reception of short-distance measurement channels are completed in a rotation of 0.4°. Therefore, the long-distance measurement of the lidar has 128 lines with the horizontal angular resolution of 0.1°. The short-distance measurement has 32 lines with the horizontal angular resolution of 0.4°. During the long-distance measurement and the short-distance measurement, differently-encoded pulses may be used to distinguish echo signals of the long-distance measurement and the short-distance measurement, to avoid misrecognition. FIG. 8 illustrates light emission sequence arrangement in short-distance measurement and long-distance measurement of a 128-line lidar, where blocks with green color represent time windows of the light emission for long-distance measurement, and blocks with yellow color represent time windows of the light emission for short-distance measurement. The short-distance measurement is performed after the long-distance measurement is completed.

Alternatively, 16 times of short-distance measurement are added each time the 128 channels sequentially emit light to perform long-distance measurement, and each short-distance measurement is preferably single-channel light emitting. 16 different short-distance measurement channels are selected in two resolutions of 0.1°, so that 32 times of emission and reception of short-distance measurement channels are completed in a rotation of 0.2°. Therefore, the long-distance measurement of the lidar has 128 lines with the horizontal angular resolution of 0.1°. The short-distance measurement has 32 lines with the horizontal angular resolution of 0.2°.

The second mode may not have 32 lines, but have more or fewer lines, which may be set according to actual situations.

A person skilled in the art may understand that, in the present disclosure, laser emitters having a large quantity of lines are not necessarily divided into groups to sequentially emit light, but may also simultaneously emit light. For example, in one case, the laser emitter array 101 includes 128 laser emitters. In the first mode, for example, 128 laser emitters may simultaneously emit the first detection laser beams (through appropriate photoelectric isolation) to provide long-distance measurement data, which has relatively less impact of optical crosstalk on long-distance measurement. In addition, in the second mode, for example, a plurality of laser emitters (for example, a group of 8 or 16 laser emitters, as long as it has less than 128 laser emitters, which have relatively separated vertical field of view) are selected to emit the second detection laser beams to perform short-distance measurement (provide short-distance measurement data). This embodiment also falls within the protected scope of the present disclosure.

Based on the foregoing analysis, the embodiments of the present disclosure provide a solution in which long-distance measurement and short-distance measurement of the lidar are performed independently and alternately. During long-distance measurement, all channels (or most of the channels) are activated to measure target objects at middle and long distances. During short-distance measurement, only a portion of channels are activated, and the horizontal scanning frequency is reduced, so that a small quantity of channels simultaneously emit light or even a single channel emits light each time, thereby greatly reducing short-distance optical crosstalk or even completely avoiding optical crosstalk. In this way, the lidar has a large quantity of lines and a high horizontal angular resolution when measuring at middle and long distances, and has a small quantity of lines and a low horizontal angular resolution when measuring at short distances. However, the capability to resolve a short-distance target object will not be significantly reduced, because the detection and recognition of the short-distance target object requires less lines and low horizontal angular resolution, and excessive lines and extremely high horizontal angular resolution may even generate light spot overlapping at a short distance and cause redundancy.

Figure 9:
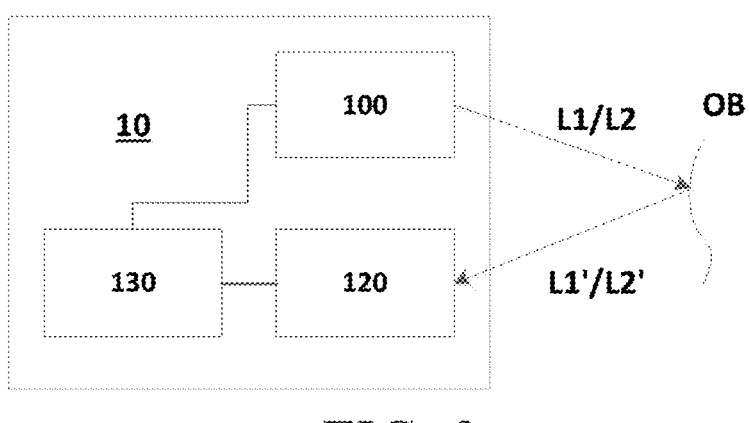
FIG. 9 shows a schematic diagram of a lidar according to an embodiment of the present disclosure.

As shown in FIG. 9, the present disclosure further relates to a lidar, and details are described below with reference to the accompanying drawings.

As shown in FIG. 9. a lidar 10 includes the emitting unit 100 described above, a receiving unit 120, and a control unit 130. The emitting unit 100 may alternately emit a first detection laser beam L1 and a second detection laser beam L2 to the outside of the lidar 10 in a first mode and a second mode, where a quantity of laser emitters used in the first mode is greater than that of laser emitters used in the second mode, and for example, the laser emitters used in the first mode and the laser emitters used in the second mode are respectively used for long-distance measurement and short-distance measurement. The first detection laser beam and the second detection laser beam generate diffuse reflection on a target object OB, and light echoes L1'/L2' are returned to the lidar and are received by the receiving unit 120. The receiving unit 120 includes a detector array, for example, an array of detector such as APD, SiPM, or SPAD. The detector array is configured to receive echoes of the first detection laser beam and the second detection laser beam reflected by the target object and convert the echoes into electrical signals. The control unit 130 is coupled to the detector array, and is configured to read the electrical signals output by the detector array, determine whether the electrical signals correspond to the first detection laser beam or to the second detection laser beam, calculate distances to the target object according to the electrical signals, and generate point cloud data according to the distance and a determined result.

A person skilled in the art may easily understand that the receiving unit 120 and the control unit 130 may be configured as separated modules, or may be integrated into a single module, which all fall within the protected scope of the present disclosure. In addition, to obtain a time of flight (TOF) to calculate the distance between the target object and the lidar by using a time of flight ranging method, the control unit 130 may be coupled to the emitting unit 100, so that emission times of the first detection laser beam and the second detection laser beam can be recorded. Certainly, the emission times may be obtained by using other methods, and details are not described herein again.

In the lidar according to the present disclosure, long-distance measurement and short-distance measurement of the lidar having a large quantity of lines can be performed independently and alternately. A largest quantity of lines and a highest angular resolution are used during the long-distance measurement, and a lesser quantity of lines and a lower angular resolution are used during the short-distance measurement, so that channels simultaneously emitting light during the short-distance measurement are reduced, thereby reducing short-distance optical crosstalk.

The present disclosure further relates to a ranging method 200 using the lidar 10 described above, as shown in FIG. 10A, and details are described below with reference to the accompanying drawings.

Step S201: Control the laser emitter array to emit a first detection laser beam in a first mode, where the first mode includes: controlling n laser emitters in the laser emitter array to emit light, where n is less than or equal to N, and N is a total quantity of laser emitters in the laser emitter array. The first mode is, for example, a long-distance measurement mode, in which preferably, all laser emitters in the laser emitter array are activated to sequentially emit the first detection laser beam.

Step S202: Control a portion of laser emitters in the laser emitter array to emit a second detection laser beam in a second mode before or after the first detection laser beam is emitted in the first mode. The second mode includes: controlling k laser emitters in the laser emitter array to emit light, where the k laser emitters are selected from the n laser emitters, and k is less than n. The second mode is, for example, a short-distance measurement mode, in which a portion of laser emitters in the laser emitter array can be activated to sequentially emit the second detection laser beam, for example.

Preferably, n is equal to the total quantity N of the laser emitters in the laser emitter array, the second mode is single-channel light emission, the n laser emitters simultaneously emit light, and the k laser emitters also simultaneously emit light.

Step S203: Receive echoes of the detection laser beams reflected by a target object, convert the echoes into electrical signals, and calculate a distance between the target object and the lidar according to the electrical signals. For example, the distance between the target object and the lidar can be obtained according to a receiving time of echoes and an emission time of a detection laser beam by using the TOF ranging method (distance=TOF*speed of light/2).

Step S204: Determine whether the electrical signals correspond to the first detection laser beam or to the second detection laser beam.

Step S205: Generate point cloud data according to the distance and a determined result. For example, when it is determined that the electrical signals correspond to the first detection laser beam (the long-distance measurement mode), if the distance between the target object and the lidar that is calculated according to the electrical signals is less than a preset distance (for example, 5 meters), because the electrical signals are used for long-distance measurement, in this case, the electrical signals may not be used or may be discarded, and are not used for generating the point cloud data. Conversely, when it is determined that the electrical signals correspond to the second detection laser beam (the short-distance measurement mode), if the distance between the target object and the lidar that is calculated according to the electrical signals is greater than a preset distance (for example, 5 meters), because the electrical signals are used for short-distance measurement, in this case, the electrical signals may not be used or may be discarded, and are not used for generating the point cloud data. Three-dimensional point cloud data with a higher accuracy is obtained by splicing data in the long-distance measurement mode and the short-distance measurement mode.

According to an embodiment of the present disclosure, as shown in FIG. 5 and FIG. 6, step S202 includes: controlling the k laser emitters in the laser emitter array to emit the second detection laser beam in the second mode after the first detection laser beam is emitted in the first mode. Alternatively, as shown in FIG. 7, step S202 includes: controlling a portion of laser emitters in the laser emitter array to emit the second detection laser beam in the second mode before the first detection laser beam is emitted in the first mode.

According to an embodiment of the present disclosure, the first mode includes: controlling the n laser emitters in the laser emitter array to emit light at each horizontal angle of the lidar. The second mode includes: controlling the k laser emitters in the laser emitter array to emit light at the same horizontal angle as that in the first mode. According to an embodiment of the present disclosure, the laser emitter array is divided into m groups to sequentially emit light, where m is an integer and m is greater than 1, each group of the laser emitter array is controlled to emit the first detection laser beam in the first mode, and the each group of the laser emitter array is controlled to emit the second detection laser beam in the second mode before or after the first detection laser beam is emitted in the first mode.

According to an embodiment of the present disclosure, the portion of laser emitters emitting the second detection laser beam at two adjacent horizontal angles of the lidar are different from each other, and the second mode circulates by taking s horizontal angles of the lidar as a period, where s is an integer greater than or equal to 2.

According to an embodiment of the present disclosure, the first detection laser beam and the second detection laser beam have differently-coded pulses. Therefore, whether the lidar echoes correspond to the first detection laser beam or to the second detection laser beam may be distinguished according to the differently-coded pulses at a receiving end, to perform a corresponding processing operation.

According to an embodiment of the present disclosure, step S204 includes: determining whether the electrical signals correspond to the first detection laser beam or to the second detection laser beam through a time window for receiving the echoes.

To distinguish the first detection laser beam and the second detection laser beam, the first detection laser beam and the second detection laser beam may have differently-coded pulses. For example, both the first detection laser beam and the second detection laser beam may use dual pulses. However, the dual pulses of the first detection laser beam and the second detection laser beam have different time intervals for encoding, so that whether the echo pulses correspond to the first detection laser beam or to the second detection laser beam can be distinguished according to an interval of echo pulses at the receiving end. In addition, the first detection laser beam and the second detection laser beam may alternatively be distinguished according to signals read in different time windows reserved by the detectors corresponding to each channel. For example, for a situation that the second mode is performed after the first mode, if the first detection laser beam in the first mode is configured to perform long-distance measurement, the detector reserves a long first time window (after the laser emitter in the channel emits light in the first mode) for the reception of echoes of the first detection laser beam reflected from the target object. After the long-distance measurement is completed in first mode, the detector reserves a short second time window for the reception of echoes of the second detection laser beam in the short-distance measurement performed in the second mode. Therefore, the first detection laser beam and the second detection laser beam are distinguished according to signals read at the first time window and the second time window of the detectors at the channels.

FIG. 10B shows another ranging method 200' using the lidar 10, where a first detection laser beam and a second detection laser beam having differently-coded pulses are used. A detailed description is given below with reference to FIG. 10B.

Step S201' and step S202' are basically the same as step S201 and step S202 in FIG. 10A respectively, and details are not described herein again.

Step S203': Determine, according to coded pulses of echoes, whether the echoes correspond to the first detection laser beam or to the second detection laser beam. Because the first detection laser beam and the second detection laser beam have differently-coded pulses, the echoes generated by the first detection laser beam and the second detection laser beam also have corresponding coded pulses, and whether the echoes correspond to the first detection laser beam or to the second detection laser beam may be distinguished according to the coded pulses.

Step S204': Calculate a distance of a target object according to a determined result of step S203' and according to time of emitting the first detection laser beam or the second detection laser beam. If the echoes correspond to the first detection laser beam, the time of emitting the first detection laser beam is used to calculate a time of flight and the distance of the target object; otherwise, the time of emitting the second detection laser beam is used to calculate the time of flight and the distance of the target object.

Step S205': Generate point cloud data according to the distance.

Based on the foregoing analysis, the present disclosure provides a solution in which long-distance measurement and short-distance measurement of the lidar are performed independently and alternately. During long-distance measurement, all channels are activated to measure target objects at middle and long distances. During short-distance measurement, only a portion of channels are activated, and the horizontal scanning frequency is reduced, so that a small quantity of channels simultaneously emit light or even a single channel emits light each time, thereby greatly reducing short-distance optical crosstalk or even completely avoiding optical crosstalk. In this way, the lidar has a large quantity of lines and a high horizontal angular resolution when measuring at middle and long distances, and has a small quantity of lines and a low horizontal angular resolution when measuring at short distances. However, the capability to resolve a short-distance target object will not be significantly reduced, because the detection and recognition of the short-distance target object requires less lines and low horizontal angular resolution lines and a horizontal angular resolution, and excessive lines and extremely high horizontal angular resolution may even generate light spot overlapping at a short distance and cause redundancy.

During long-distance measurement, that all channels are activated may be understood as that all laser emitters sequentially emit light during the long-distance measurement, and data obtained in time windows corresponding to the detectors of all channels is valid within a long-distance measurement distance range. During short-distance measurement, that a portion of channels are activated may be understood as that a portion of laser emitters sequentially emit light during the short-distance measurement, and data obtained in time windows corresponding to the detectors of the portion of channels is valid within a short-distance measurement distance range. During the long-distance measurement and the short-distance measurement, different codes may be used to distinguish echo signals of the long-distance measurement and the short-distance measurement, to avoid misrecognition.

In the present disclosure, long-distance measurement and short-distance measurement of the lidar having a large quantity of lines are performed independently and alternately. A largest quantity of lines and a highest resolution are used during the long-distance measurement, and a lesser quantity of lines and a lower resolution are used during the short-distance measurement, so that channels simultaneously emitting light during the short-distance measurement are reduced, thereby reducing short-distance optical crosstalk. For example, long-distance measurement and short-distance measurement of the lidar having a large quantity of lines are performed independently and alternately. A largest quantity of lines and a highest resolution are used during the long-distance measurement, and a lesser quantity of lines and a lower resolution are used during the short-distance measurement, so that channels simultaneously emitting light during the short-distance measurement are reduced.

It may be inferred from the foregoing facts that the lidar may emit light in parallel by using a large quantity of channels, to improve the resolution of a long-distance target. In addition, a lesser quantity of channels are used to measure the short-distance target object, and the channels that simultaneously emit light during short-distance measurement are as few as possible, to reduce the interference between the channels that simultaneously emit light, so that the precision of the short-distance measurement is greatly improved.

Second Aspect

A second aspect of the present disclosure is based on the first aspect. According to a result of short-distance ranging of the lidar and to reduce the power consumption of a lidar, a light intensity for long-distance measurement is controlled for the next found of detection when the lidar scans the same position or a nearby position such that an emission intensity of the laser emitters in a long-distance measurement mode may be greatly reduced or may be even turned off. Detailed description is given below.

In an embodiment of the present disclosure, when the lidar detects that a target object exists at a short distance, lights of laser emitters for the long-distance measurement mode have relatively smaller impact on that of the laser emitters for a short-distance measurement mode. Therefore, the emission intensity in the long-distance measurement mode can be reduced, while the emission intensity in the short-distance measurement mode may not be adjusted. This method can reduce the overall power consumption of the lidar without affecting the capability of short-distance ranging. Specifically, when the lidar is controlled to scan within a corresponding angle range in a next detection according to a result of short-distance ranging in a first detection, great reduction or even turn-off of the emission intensity of the laser emitters in the long-distance measurement mode can reduce the power consumption of the lidar in a case that a target object exists at a short distance. Detailed description is given below with reference to the accompanying drawings.

FIG. 11 shows a control method 300 of a lidar according to an embodiment of the present disclosure. The control method 300 may be implemented through the lidar according to the first aspect of the present disclosure. More specifically, the lidar performing the control method 300 includes a laser emitter array with N laser emitters. The control method 300 includes the following steps:

Step S301: Control n laser emitters to emit a first detection laser beam, and control k laser emitters among the n laser emitters to emit a second detection laser beam, where n is less than or equal to N, the k laser emitters are selected from the n laser emitters, and k is less than n. In a specific implementation, the first detection laser beam may be emitted before or after the second detection laser beam is emitted. If the first detection laser beam is used for the long-distance measurement, a light intensity of the first detection laser beam may be greater than a light intensity of the second detection laser beam.

For example, a horizontal angular resolution of the lidar is 0.2°, and the lidar is angularly triggered at 0°, 0.2°, 0.4°, . . . , etc starting from 0° respectively, to perform a period of detection (detection period) at each horizontal angle. In each period, the lidar performs the light emission detection shown in FIG. 5. In addition, it can be easily understood that, at each angle of the lidar, a plurality of laser emitters of the lidar emit light. Preferably, the plurality of laser emitters are divided in groups to emit light in sequence. Since a switching speed of multiple groups of laser emitters for light emission is significantly higher than a rotation speed of the lidar, it is deemed that the plurality of laser emitters can emit light at the same angle (although actually a certain angular displacement occurs). The first detection laser beam emitted by the n laser emitters generally has a higher intensity, and thus is used in the long-distance measurement mode (a first mode). The second detection laser beam emitted by the k laser emitters has lower intensity, and is generally used in the short-distance measurement mode (a second mode).

With reference to FIG. 5, in an emitting unit including 128 laser emitters, eight laser emitters are selected and are respectively numbered 1-1, 3-1, 4-2, 5-3, 7-4, 9-5, 10-3, and 12-1. After a normal emission in the long-distance measurement mode, one emission in the short-distance measurement mode is added for all the eight laser emitters. Therefore, 8 times of short-distance measurement emission are added when 128 channels sequentially emit light to perform long-distance measurement. In addition, in FIG. 5, for the selected eight laser emitters, the emission of the first detection laser beam is performed after the emission of the second detection laser beam, which is not limited by the present disclosure. As shown in FIG. 7, the emission of the first detection laser beam may alternatively be performed before the emission of the second detection laser beam.

Step S302: Receive echoes, reflected by a target object, of the first detection laser beam and the second detection laser beam.

After the first detection laser beam and the second detection laser beam are diffusely reflected on the target object, parts of reflected beams (echoes) are returned to the lidar, and are received by a detector of a receiving unit of the lidar and converted into electrical signals.

Step S303: Calculate a distance of the target object according to the echoes.

According to the echoes and an emission time of the detection laser beam corresponding to the echoes, the distance of the target object may be calculated.

The first detection laser beam and the second detection laser beam may have differently-coded pulses. For example, both the first detection laser beam and the second detection laser beam may use dual pulses. However, the dual pulses of the first detection laser beam and the second detection laser beam have different time intervals for encoding, so that whether the echo pulses correspond to the first detection laser beam or to the second detection laser beam can be distinguished according to an interval of echo pulses at the receiving end, and the distance of the target object can be calculated according to time of emitting the first detection laser beam or the second detection laser beam. For example, both the first detection laser beam and the second detection laser beam are dual pulses, the time interval between a first pulse p1 and a second pulse p2 of the first detection laser beam is Δt1, and the time interval between a first pulse p1 and a second pulse p2 of the second detection laser beam is Δt2. If two adjacent pulses with an interval of Δt1 are received, it may be determined that the echo pulses correspond to the first detection laser beam. Similarly, if two adjacent pulses with an interval of Δt2 are received, it may be determined that the echo pulses correspond to the second detection laser beam. For another example, both the first detection laser beam and the second detection laser beam have three pulses, the time interval between a first pulse p1 and a second pulse p2 of the first detection laser beam is Δt1, the time interval between the second pulse p2 and a third pulse p3 of the first detection laser beam is Δt1", the time interval between a first pulse p1 and a second pulse p2 of the second detection laser beam is Δt2, and the time interval between the second pulse p2 and a third pulse p3 of the second detection laser beam is Δt2". If three adjacent pulses with intervals of Δt1 and Δt1" in sequence are received, it may be determined that the echo pulses correspond to the first detection laser beam. Similarly, if three adjacent pulses with intervals of Δt2 and Δt2" in sequence are received, it may be determined that the echo pulses correspond to the second detection laser beam.

Alternatively, the first detection laser beam and the second detection laser beam may be distinguished according to signals read in different time windows reserved by the detectors corresponding to each channel. For example, for a situation that the second detection laser beam is emitted after the first detection laser beam, the detector may reserve a relatively long first time window (after the laser emitter in the channel emits the first detection laser beam) for the reception of echoes of the first detection laser beam reflected from the target object, and then reserve a relatively short second time window for the reception of echoes of the second detection laser beam. Therefore, whether the echoes correspond to the first detection laser beam or to the second detection laser beam may be determined through the first time window and the second time window of the detectors at the channels. Then, a time of flight TOF is obtained according to time of emitting the first detection laser beam or the second detection laser beam, and a distance between the target object and the lidar may be obtained by multiplying the time of flight by a speed of light c and then dividing the product by 2. According to an exemplary embodiment of the present disclosure, long-distance measurement and short-distance measurement may be distinguished by 3 meters. When the distance between the target object and the lidar is greater than 3 meters, the measurement belongs to the long-distance measurement and corresponds to the TOF time of more than 20 ns. When the distance between the target object and the lidar is less than 3 meters, the measurement belongs to the short-distance measurement and corresponds to the TOF time within 20 ns.

Preferably, n is equal to N. In the long-distance measurement mode, all laser emitters in the laser emitter array are used to alternately emit light for detection. Correspondingly, the receiving end starts to receive the echo signals, but directly filter out signals within a duration of TOF less than or equal to 20 ns without further processing. In the short-distance measurement mode, a portion of the laser emitters in the laser emitter array 101 are used to alternately emit light for detection. Correspondingly, the receiving end starts to receive the echo signals, but only receive the signals within a duration of TOF less than or equal to 20 ns for further processing, and detects an actual distance between an object that may be within a range of 3 meters and the lidar, and a reflection rate according to the processing on the signals.

According to another embodiment of the present disclosure, a probable distance between the target object and the lidar may also be calculated based on the detected echoes and time of emitting the first detection laser beam and the second detection laser beam respectively. Then, whether the echoes correspond to the first detection laser beam or to the second detection laser beam is determined (for example, it is determined by an expected detection distance specifically corresponding to each detection laser beam), and the distance of the target object is determined from two probable distances.

Step S304: Reduce, in a case that the target object is detected in a preset distance, an emission intensity of the first detection laser beam emitted by at least parts of the n laser emitters in a range corresponding to the target object in a next detection period.

In a case that the target object is detected in the preset distance, it indicates the presence of a short-distance target object. Therefore, in the next detection period, when the lidar is rotated to the angle range corresponding to the target object, an emission intensity of the first detection laser beam emitted by at least parts of the n laser emitters emitting light in the long-distance measurement mode may be reduced, thereby reducing the power consumption and crosstalk. A range of the preset distance may be determined according to an application scenario and a technical parameter of the lidar. For example, a distance within 5 meters from the lidar may be considered to be within the preset distance, and a distance beyond 5 meters is outside the preset distance.

According to an exemplary embodiment of the present disclosure, an approximately corresponding angle range of the next scan on the same object may be predicted according to a type of the target object, a motion parameter, and a detection parameter of the lidar, and the emission intensity of the first detection laser beam may be reduced within the predicted angle range. For example, the angle range of the next scan of the lidar on the object is predicted according to the type (dynamic or static) of the target object, a motion speed, a direction, a rotation speed of the lidar, an angular speed of an internal galvo/swinging mirror of the lidar, and the like, and the emission intensity of the first detection laser beam is reduced.

Therefore, according to the second aspect of the present disclosure, the first detection laser beam in the long-distance measurement mode and the second detection laser beam in the short-distance measurement mode may be separated independently. According to feedback of a detection result, a light intensity of the first detection laser beam is adjusted correspondingly (if an object exists at a short distance, the light intensity of the first detection laser beam is reduced; and if no object exists at a short distance, the light intensity of the first detection laser beam remains the same), and the light intensity of the second detection laser beam may remain the same. In this manner, light emitting power consumption of long-distance measurement may be reduced without lowering the capability of short-distance ranging.

FIG. 12a shows a detection strategy of the lidar according to the second aspect of the present disclosure. FIG. 12a shows a top view of the lidar, where the lidar rotates along a direction shown by an arrow on the paper. A plurality of lines in FIG. 12a represent detection laser beams emitted by the lidar when the lidar is rotated to different positions (angles). A bold solid line represents a first detection laser beam (strong) with a higher light intensity, a thin solid line represents a first detection laser beam (weak) with a lower light intensity, and a dashed line represents a second detection laser beam. As shown in FIG. 12a, during the first detection, the lidar emits the first detection laser beam with a normal high light intensity. In addition, for some of the laser emitters, emission of the second detection laser beam is added before or after emission of the first detection laser beam, and according to the echoes, it is determined that an object exists at a position relatively close to the lidar. Correspondingly, when the lidar is rotated to the position corresponding to the target object next time, the lidar may reduce the light intensity of the first detection laser beam emitted by the laser emitters. In this manner, the power consumption of the lidar is reduced. In addition, the light intensity of the second detection laser beam in the short-distance measurement mode is not affected, and it can still be ensured that the short-distance object can be detected. Therefore, as shown in FIG. 12b, it can still be ensured that the echoes generated by reflection from the short-distance object are higher than a threshold Th.

According to an exemplary embodiment of the present disclosure, an angle range a (as shown in FIG. 12b) of the target object located in the preset distance is obtained according to the distance of the target object, and the emission intensity of the first detection laser beam emitted by the laser emitters of the n laser emitters within the angle range a in the next detection period is reduced. After one detection period, the lidar may roughly determine the angle range a corresponding to the target object according to a point cloud. For example, at an edge position (as shown in FIG. 12b, at left and right edges of the angle range a), a distance shown by the point cloud changes suddenly, that is, distance corresponding to points within the angle range are relatively small, and distances corresponding to points outside the angle range increase suddenly. In this manner, the angle range of the short-distance object may be outlined roughly. Alternatively, a portion of laser emitters within the angle range a among the n laser emitters may be turned off in the next detection period. FIG. 12b only shows the angle range a of the target object in a horizontal direction. Alternatively, an angle range of the target object in a vertical direction may be obtained, and details are not described herein again.

Through the control method of the lidar according to the second aspect of the present disclosure, if an object is detected at a short distance in the first scan, the light intensity of the first detection laser beam is reduced in the next (second) scan of the same angle, so as to reduce the power consumption of the radar. In addition, a light intensity of the radar for the short-distance detection is not reduced. In this way, the short-distance object can be detected no matter in the first detection or the second detection. According to an exemplary embodiment of the present disclosure, a normal emission intensity (a laser beam for long-distance measurement (strong) at the left of FIG. 12a) of the first detection laser beam in the long-distance measurement mode is twice as high as the emission intensity of the second detection laser beam in the short-distance measurement mode. During designing an operating parameter of the lidar, it can be ensured that the emission intensity of the second detection laser beam is lower than a human eye safety threshold, and the emission intensity of the second detection laser beam is higher than that of the reduced first detection laser beam (a laser beam for long-distance measurement (weak) at the right of FIG. 12a).

In the lidar according to the second aspect of the present disclosure, if an object exists within the preset distance from the lidar, the object will be detected by the second detection laser beam emitted by the laser emitters. FIG. 13a shows the detection of the object at a short distance by the first detection laser beam and the second detection laser beam emitted during the first detection, where a size of a light spot indicates a relative intensity of laser beams, which may be similar or dissimilar with an actual size of the emitted light spot. A detected point cloud diagram may further refer to FIG. 12b. It can be seen that the lateral (horizontal) and longitudinal (vertical) resolutions generated by the second detection laser beam are likely to be lower than those generated by the first detection laser beam. Specifically, it can be seen from a light spot scanning diagram at the right side of FIG. 13a that in a range of the short-distance object, the lateral resolution generated by the second detection laser beam is approximately half ($\frac{3}{7}$) of the lateral resolution generated by the first detection laser beam, and the longitudinal resolution generated by the second detection laser beam is approximately half ($\frac{2}{4}$) of the longitudinal resolution generated by the first detection laser beam.

An angle range (a horizontal angle and a vertical angle) of the short-distance object may be calculated according to a detection result of the lidar, and then the light intensity at which all channels within this angle range emit the first detection laser beam is reduced. As shown in FIG. 13b, when the second scan reaches the position corresponding to the short-distance object, the emission intensity of the first detection laser beam is reduced. However, because the emission intensity of the second detection laser beam does not change, a point cloud diagram obtained in the second detection may still be FIG. 12*b*, so that it can be ensured that the lidar does not lose the capability of short-distance ranging, but has reduced the power consumption.

For step S304, preferably, the angle range of the short-distance object may be outlined by calculating a domain of influence of each point cloud of short-distance measurement. The so-called domain of influence may be deemed as a range of the point cloud (or line) affected by a result of short-distance ranging of each point cloud of short-distance measurement. In the lidar, one (or more) laser emitter and a detector constitute a detection channel. For example, a certain detection channel detects an object at a short distance at a certain horizontal angle position in a short-distance measurement mode, and then the detection channel transmits the information to surrounding detection channels, to transfer information that "an object exists at a short distance at the current position" to the surrounding detection channels. After the surrounding detection channels receive the information, a light intensity for long-distance measurement is reduced in this angle range. As shown in FIG. 15 below, the domain of influence may be divided by a centerline between two point clouds of short-distance measurement, so that a position of each point cloud of long-distance measurement can be notified.

In addition, because the short-distance object detected by the lidar may be an organism, according to an embodiment of the present disclosure, the strategy of reducing the emission intensity of the long-distance measurement mode may be adopted in advance and be delayed in cancellation. In other words, before the laser beam reaches the angle range of the short-distance object, the light intensity for long-distance measurement may be reduced in advance, and after the laser beam leaves the angle range of the short-distance object, a relatively low light intensity for the long-distance measurement may be maintained. A range of advance and delay may be set in a preset manner.

Figure 14:
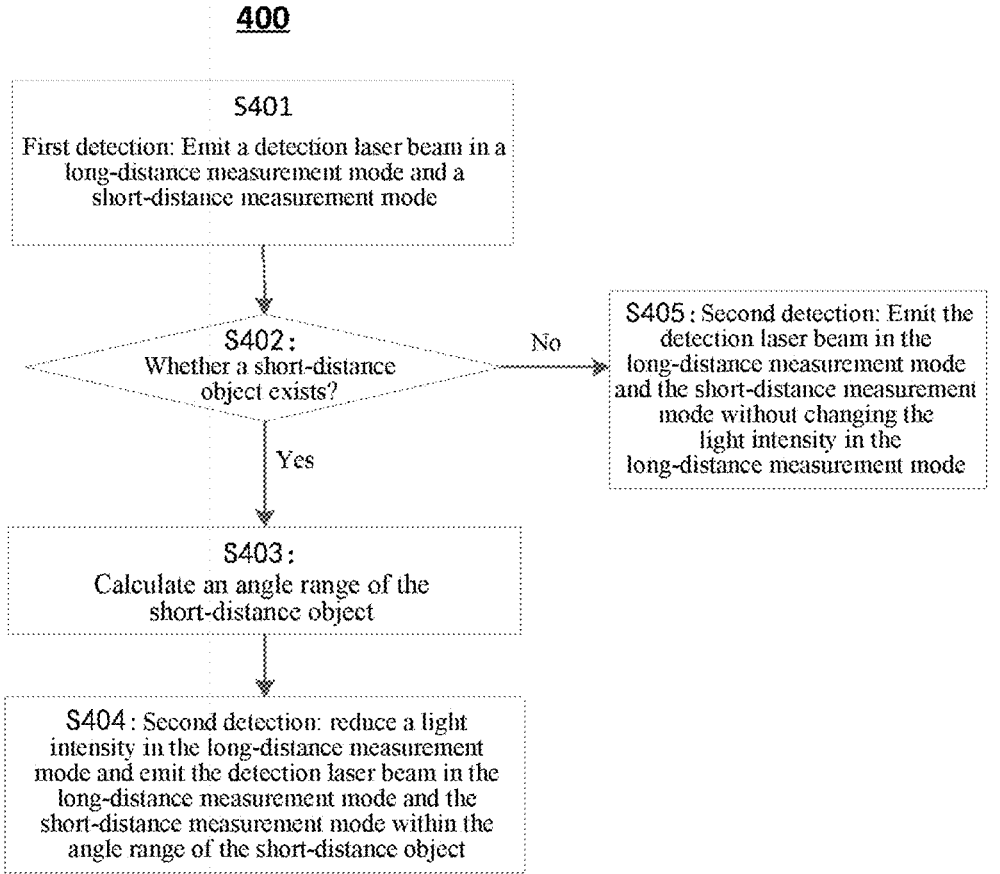
FIG. 14 shows a working method of a lidar according to an embodiment of the present disclosure.

FIG. 14 shows a working method 400 of a lidar.

Step S401: Perform, by the lidar, a first detection, and emit a detection laser beam in a long-distance measurement mode and a short-distance measurement mode respectively.

Step S402: Determine whether a short-distance object exists. If a short-distance object exists, perform step S403; otherwise, perform step S405. A range of the short distance may be determined according to an application scenario and a technical parameter of the lidar. For example, a distance within 5 meters from the lidar may be considered to be the short distance, and a distance beyond 5 meters is not the short distance.

Step S403: Calculate an angle range of the short-distance object, such as, an angle range in a horizontal direction and an angle range in a vertical direction.

Step S404: Perform a second detection, that is, when the lidar is rotated to the angle range of the short-distance object, reducing a light intensity in the long-distance measurement mode and emitting the detection laser beam in the long-distance measurement mode and the short-distance measurement mode.

Step S405: Still emit, in a case that a short-distance object does not exist and when the lidar is rotated to the same angle range, the detection laser beam in the combination of long-distance measurement mode and the short-distance measurement mode without changing the light intensity in the long-distance measurement mode.

For step S403, preferably, the angle range of the short-distance object may be outlined by calculating a domain of influence of each point cloud of short-distance measurement. The so-called domain of influence may be deemed as a range of the point cloud (or line) affected by a result of short-distance ranging of each point cloud of short-distance measurement. In the lidar, one laser emitter and a detector constitute a detection channel. For example, a certain detection channel detects an object at a short distance at a certain horizontal angle position in a short-distance measurement mode, and then the detection channel transmits the information to surrounding detection channels, to transfer information that "an object exists at a short distance at the current position" to the surrounding detection channels. After the surrounding detection channels receive the information, a light intensity for long-distance measurement is reduced in this angle range. As shown in FIG. 15 below, the domain of influence may be divided by a centerline between two point clouds of short-distance measurement, so that a position of each point cloud of long-distance measurement can be notified.

In addition, because the short-distance object detected by the lidar may be an organism, according to an embodiment of the present disclosure, the strategy of reducing the emission intensity of the long-distance measurement mode may be adopted in advance and be delayed to cancel. In other words, before the laser beam reaches the angle range of the short-distance object, the light intensity for long-distance measurement may be reduced in advance, and after the laser beam leaves the angle range of the short-distance object, a relatively low light intensity for the long-distance measurement may be maintained. A range of advance and delay may be set in a preset manner.

According to an embodiment of the present disclosure, during the second detection, within the angle range of the short-distance object, a portion of channels for long-distance measurement may be chosen to turn off (or a horizontal angular resolution may be reduced, with reference to FIG. 16), or a vertical angular resolution may be reduced with reference to FIG. 17, instead of reducing the emission intensity of all laser emitters in the long-distance measurement mode. Alternatively, the horizontal angular resolution and the vertical angular resolution may be reduced together.

The second aspect of the present disclosure further relates to a lidar. A structure of the lidar is as shown in FIG. 10, including an emitting unit 100 (with a laser emitter array 101 including N laser emitters), a receiving unit 120 and a control unit 130. The laser emitter array 101 is configured to emit detection light beams. The receiving unit 120 includes a detector array and is configured to receive echoes of the detection laser beam reflected by a target object and convert the echoes into electrical signals. The control unit is coupled to the laser emitter array and the receiving unit, and is configured to calculate a distance of the target object according to the electrical signals, control n laser emitters to emit a first detection laser beam, and control k laser emitters among the n laser emitters to emit a second detection laser beam, where n is less than or equal to N, the k laser emitters are selected from the n laser emitters, k is less than n, and a light intensity of the first detection laser beam is greater than a light intensity of the second detection laser beam; and the control unit is configured to reduce, in a case that the target object is detected in a preset distance, an emission intensity of the first detection laser beam emitted by at least parts of the n laser emitters in a range corresponding to the target object in a next detection period.

The control unit 130 may perform the control method of the lidar described above. For example, the control unit may obtain an angle range of the target object located in the preset distance according to the output distance of the target object, and reduce the emission intensity of the first detection laser beam emitted by laser emitters within the angle range among the n laser emitters in the next detection period. The control unit may obtain the angle range of the target object located in the preset distance according to the output distance of the target object, and turn off emission of the first detection laser beam by parts of the n laser emitters within the angle range in the next detection period.

According to an exemplary embodiment of the present disclosure, p laser emitters and a detector constitute a detection channel, p is greater than or equal to 1, and the control unit is configured to: control, in a case that one detection channel detects the target object located in the preset distance, laser emitters of a detection channel in a preset range around the detection channel to reduce the emission intensity of the first detection laser beam emitted in the next detection period.

According to an exemplary embodiment of the present disclosure, the preset range is determined according to a centerline between two point clouds of short-distance measurement.

According to an exemplary embodiment of the present disclosure, the control unit is configured to: obtain the angle range of the target object located in the preset distance according to the distance of the target object output by the control unit, and reduce the emission intensity of a long-distance measurement mode of laser emitters within the angle range and a preset range near the angle range in the next detection period.

According to an exemplary embodiment of the present disclosure, the control unit is configured to: correct the angle range in the next detection period according to one or more of a type of the target object, a motion parameter, and a detection parameter of the lidar.

According to an embodiment of the present disclosure, compared to the second detection laser beam, the first detection laser beam is used for measuring a target object at a longer distance, the N laser emitters are divided into m groups to sequentially emit light, m is an integer and m is greater than 1, and the control unit is configured to: control the n laser emitters in each group of laser emitter array to emit the first detection laser beam at each horizontal angle of the lidar; and control the k laser emitters in the laser emitter array to emit the second detection laser beam at the same horizontal angle before or after the first detection laser beam is emitted.

According to an embodiment of the present disclosure, the first detection laser beam and the second detection laser beam have differently-coded pulses; and the control unit is configured to: determine, according to the differently-coded pulses, whether the echoes correspond to the first detection laser beam or to the second detection laser beam, and calculate the distance of the target object according to time of emitting the first detection laser beam or the second detection laser beam.

According to an embodiment of the present disclosure, the control unit is configured to: determine, through a time window for receiving the echoes, whether the echoes correspond to the first detection laser beam or to the second detection laser beam, and calculate the distance of the target object according to time of emitting the first detection laser beam or the second detection laser beam.

According to an embodiment of the present disclosure, the control unit is configured to: calculate a probable distance between the target object and the lidar based on the detected echoes and time of emitting the first detection laser beam and the second detection laser beam, respectively; and determine whether the echoes correspond to the first detection laser beam or to the second detection laser beam, and determine the distance of the target object.

The present disclosure further relates to a computer-readable storage medium, including computer-executable instructions stored on the computer-readable storage medium, where the computer-executable instructions, when executed by a processor, implement the control method described above.

Through the embodiments of the present disclosure, when a result of short-distance ranging is used for the next found of detection when the lidar scans a nearby position, great reduction or even turn-off of the emission intensity of the laser emitters in the long-distance measurement can reduce the power consumption of the lidar in a case that a target object exists at a short distance.

It should be finally noted that the foregoing descriptions are merely preferred embodiments of the present disclosure, but are not intended to limit the present disclosure. Although the present disclosure has been described in detail with reference to the foregoing embodiments, for a person of ordinary skill in the art, modifications can still be made to the technical solutions described in the foregoing embodiments, or equivalent replacements can still be made to some technical features in the technical solutions. Any modification, equivalent replacement, improvement, or the like made within the spirit and principle of the present disclosure shall fall within the protected scope of the present disclosure.

What is claimed is:

1. A control method of a lidar, wherein the lidar comprises a laser emitter array with N laser emitters, and the control method comprising:

S301: controlling n laser emitters to emit a first detection laser beam, and controlling k laser emitters among the n laser emitters to emit a second detection laser beam, wherein n is less than or equal to N, the k laser emitters are selected from the n laser emitters, k is less than n, and a light intensity of the first detection laser beam is greater than a light intensity of the second detection laser beam;

S302: receiving echoes, reflected by a target object, of the first detection laser beam and the second detection laser beam;

S303: calculating a distance of the target object according to the echoes; and

S304: reducing, in a case that the target object is detected in a preset distance, an emission intensity of the first detection laser beam emitted by at least parts of the n laser emitters in a range corresponding to the target object in a next detection period.

2. The control method according to claim 1, wherein the step S304:

obtaining an angle range of the target object located in the preset distance according to the distance of the target object; and reducing the emission intensity of the first detection laser beam emitted by laser emitters within the angle range among the n laser emitters in the next detection period.

3. The control method according to claim 1, wherein the step S304:

obtaining the angle range of the target object located in the preset distance according to the distance of the target object; and turning off parts of the n laser emitters within the angle range in the next detection period.

4. The control method according to claim 2, wherein p laser emitters and a detector constitute a detection channel, p is greater than or equal to 1, and the step S304:

controlling, in a case that one detection channel detects the target object located in the preset distance, laser emitters of a detection channel in a preset range around the detection channel to reduce the emission intensity of the first detection laser beam emitted in the next detection period.

5. The control method according to claim 4, wherein the preset range is determined according to a centerline between two point clouds of short-distance measurement.

6. The control method according to claim 2, wherein the step S304:

correcting the angle range in the next detection period according to one or more of a type of the target object, a motion parameter, and a detection parameter of the lidar.

7. The control method according to claim 1, wherein the N laser emitters are divided into m groups to sequentially emit light, m is an integer and m is greater than 1, and the step S301:

controlling the n laser emitters in each group of laser emitter array to emit the first detection laser beam at each horizontal angle of the lidar; and controlling the k laser emitters in the laser emitter array to emit the second detection laser beam at the same horizontal angle before or after the first detection laser beam is emitted.

8. The control method according to claim 1, wherein the first detection laser beam and the second detection laser beam have differently-coded pulses, and the step S303:

determining, according to the differently-coded pulses, whether the echoes correspond to the first detection laser beam or to the second detection laser beam, and calculating the distance of the target object according to time of emitting the first detection laser beam or the second detection laser beam.

9. The control method according to claim 1, wherein the step S303:

determining, through a time window for receiving the echoes, whether the echoes correspond to the first detection laser beam or to the second detection laser beam; and calculating the distance of the target object according to time of emitting the first detection laser beam or the second detection laser beam.

10. The control method according to claim 1, wherein the step S303:

calculating a probable distance between the target object and the lidar based on the detected echoes and time of emitting the first detection laser beam and the second detection laser beam respectively, determining whether the echoes correspond to the first detection laser beam or to the second detection laser beam; and determining the distance of the target object.

11. A lidar, comprising:

a laser emitter array with N laser emitters, configured to emit a detection laser beam;

a receiving unit, comprising a detector array and configured to receive echoes of the detection laser beam reflected by a target object and convert the echoes into electrical signals; and a control unit, coupled to the laser emitter array and the receiving unit, and configured to calculate a distance of the target object according to the electrical signals, control n laser emitters to emit a first detection laser beam, and control k laser emitters among the n laser emitters to emit a second detection laser beam, wherein n is less than or equal to N, the k laser emitters are selected from the n laser emitters, k is less than n, and a light intensity of the first detection laser beam is greater than a light intensity of the second detection laser beam; and the control unit is configured to reduce, in a case that the target object is detected in a preset distance, an emission intensity of the first detection laser beam emitted by at least parts of the n laser emitters in a range corresponding to the target object in a next detection period.

12. The lidar according to claim 11, wherein the control unit is configured to:

obtain an angle range of the target object located in the preset distance according to the distance of the target object;

and reduce the emission intensity of the first detection laser beam emitted by laser emitters within the angle range among the n laser emitters in the next detection period.

13. The lidar according to claim 12, wherein the control unit is configured to:

obtain the angle range of the target object located in the preset distance according to the distance of the target object; and turn off emission of the first detection laser beam emitted by parts of the n laser emitters within the angle range in the next detection period.

14. The lidar according to claim 12, wherein p laser emitters and a detector constitute a detection channel, p is greater than or equal to 1, and the control unit is configured to:

control, in a case that one detection channel detects the target object located in the preset distance, laser emitters of a detection channel in a preset range around the detection channel to reduce the emission intensity of the first detection laser beam emitted in the next detection period.

15. The lidar according to claim 14, wherein the preset range is determined according to a centerline between two point clouds of short-distance measurement.

16. The lidar according to claim 12, wherein the control unit is configured to:

obtain the angle range of the target object located in the preset distance according to the distance of the target object output by the control unit; and reduce the emission intensity of a long-distance measurement mode of laser emitters within the angle range and a preset range near the angle range in the next detection period.

17. The lidar according to claim 13, wherein the control unit is configured to:

correct the angle range in the next detection period according to one or more of a type of the target object, a motion parameter, and a detection parameter of the lidar.

18. The lidar according to claim 12, wherein compared to the second detection laser beam, the first detection laser beam is used for measuring a target object at a longer distance, the N laser emitters are divided into m groups to sequentially emit light, m is an integer and m is greater than 1, and the control unit is configured to:

control the n laser emitters in each group of laser emitter array to emit the first detection laser beam at each horizontal angle of the lidar; and control the k laser emitters in the laser emitter array to emit the second detection laser beam at the same horizontal angle before or after the first detection laser beam is emitted.

19. The lidar according to claim 12, wherein the first detection laser beam and the second detection laser beam have differently-coded pulses; and the control unit is configured to: determine, according to the differently-coded pulses, whether the echoes correspond to the first detection laser beam or to the second detection laser beam, and calculate the distance of the target object according to time of emitting the first detection laser beam or the second detection laser beam.

20. The lidar according to claim 11, wherein the control unit is configured to:

determine, through a time window for receiving the echoes, whether the echoes correspond to the first detection laser beam or to the second detection laser beam; and calculate the distance of the target object according to time of emitting the first detection laser beam or the second detection laser beam.

21. The lidar according to claim 11, wherein the control unit is configured to:

calculate a probable distance between the target object and the lidar based on the detected echoes and time of emitting the first detection laser beam and the second detection laser beam respectively; and determine whether the echoes correspond to the first detection laser beam or to the second detection laser beam, and determine the distance of the target object.

22. A computer-readable storage medium, comprising:

computer-executable instructions stored on the computer-readable storage medium, wherein the computer-executable instructions, when executed by a processor, implement the control method according to claim 1.

\* \* \* \* \*